(12) United States Patent
Prakash et al.

(10) Patent No.: US 12,505,885 B2
(45) Date of Patent: Dec. 23, 2025

(54) PLANE AND BLOCK LOCATION DEPENDENT VOLTAGE BIASES IN NAND MEMORY

(71) Applicant: Sandisk Technologies, Inc., Milpitas, CA (US)

(72) Inventors: Abhijith Prakash, Milpitas, CA (US); Xiang Yang, Santa Clara, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 155 days.

(21) Appl. No.: 18/230,336

(22) Filed: Aug. 4, 2023

(65) Prior Publication Data

US 2024/0363168 A1 Oct. 31, 2024

Related U.S. Application Data

(60) Provisional application No. 63/462,387, filed on Apr. 27, 2023.

(51) Int. Cl.
| | | |
|---|---|---|
| *G11C 16/00* | (2006.01) | |
| *G11C 16/04* | (2006.01) | |
| *G11C 16/08* | (2006.01) | |
| *G11C 16/14* | (2006.01) | |
| *G11C 16/24* | (2006.01) | |
| *G11C 16/30* | (2006.01) | |
| *H10B 41/27* | (2023.01) | |
| *H10B 41/35* | (2023.01) | |

(Continued)

(52) U.S. Cl.
CPC .......... *G11C 16/14* (2013.01); *G11C 16/0483* (2013.01); *G11C 16/08* (2013.01); *G11C 16/24* (2013.01); *G11C 16/30* (2013.01); *H10B 41/27* (2023.02); *H10B 41/35* (2023.02); *H10B 43/27* (2023.02); *H10B 43/35* (2023.02)

(58) Field of Classification Search
CPC ..... G11C 16/0483; G11C 16/08; G11C 16/14; G11C 16/26; G11C 16/30; G11C 16/10; G11C 16/32; G11C 16/24; G11C 5/145; G11C 5/147; G11C 8/10; G11C 16/16; G11C 16/3445; G11C 7/222; G11C 11/5628; G11C 11/5642; G11C 7/22; G11C 8/08; G11C 8/12; G11C 8/14; G11C 16/3459; G11C 2216/20; G11C 16/06; G11C 16/3404; G11C 16/3409; G11C 16/3413; H10B 41/27; H10B 41/35; H10B 43/27; H10B 43/35
USPC ............ 365/185.11, 185.12, 185.17, 185.19, 365/185.22, 185.29, 185.3
See application file for complete search history.

(56) References Cited

U.S. PATENT DOCUMENTS 10,741,248 B2 * 8/2020 Sung ...................... G11C 16/08

\* cited by examiner

*Primary Examiner* — Thong Q Le
(74) *Attorney, Agent, or Firm* — Dickinson Wright PLLC

(57) ABSTRACT

The memory device includes a chip with at least one voltage pump and a plurality of planes. The planes have arrays of memory cells that can be programmed and erased. At least some of the planes are at different distances from the at least one voltage pump. The memory device further includes control circuitry that is configured to program and erase the memory cells. The control circuitry is further configured to supply at least one voltage to a selected plane of the plurality of planes during a programming operation or an erase pulse and adjust the at least one voltage that is supplied to the selected plane by a parameter that is determined based on a distance between the selected plane and the at least one voltage pump.

18 Claims, 27 Drawing Sheets

(51) Int. Cl.
*H10B 43/27* (2023.01)
*H10B 43/35* (2023.01)

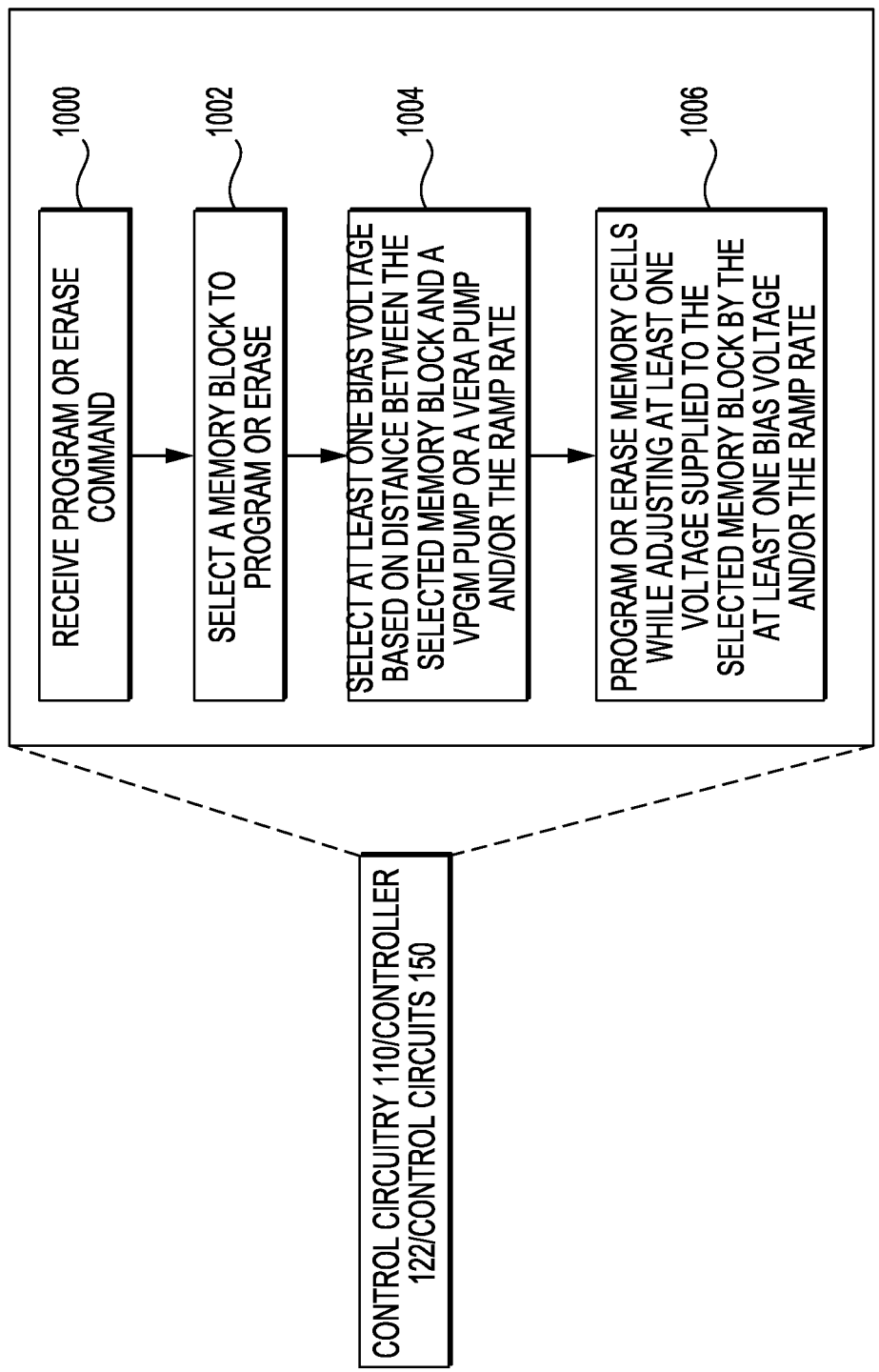

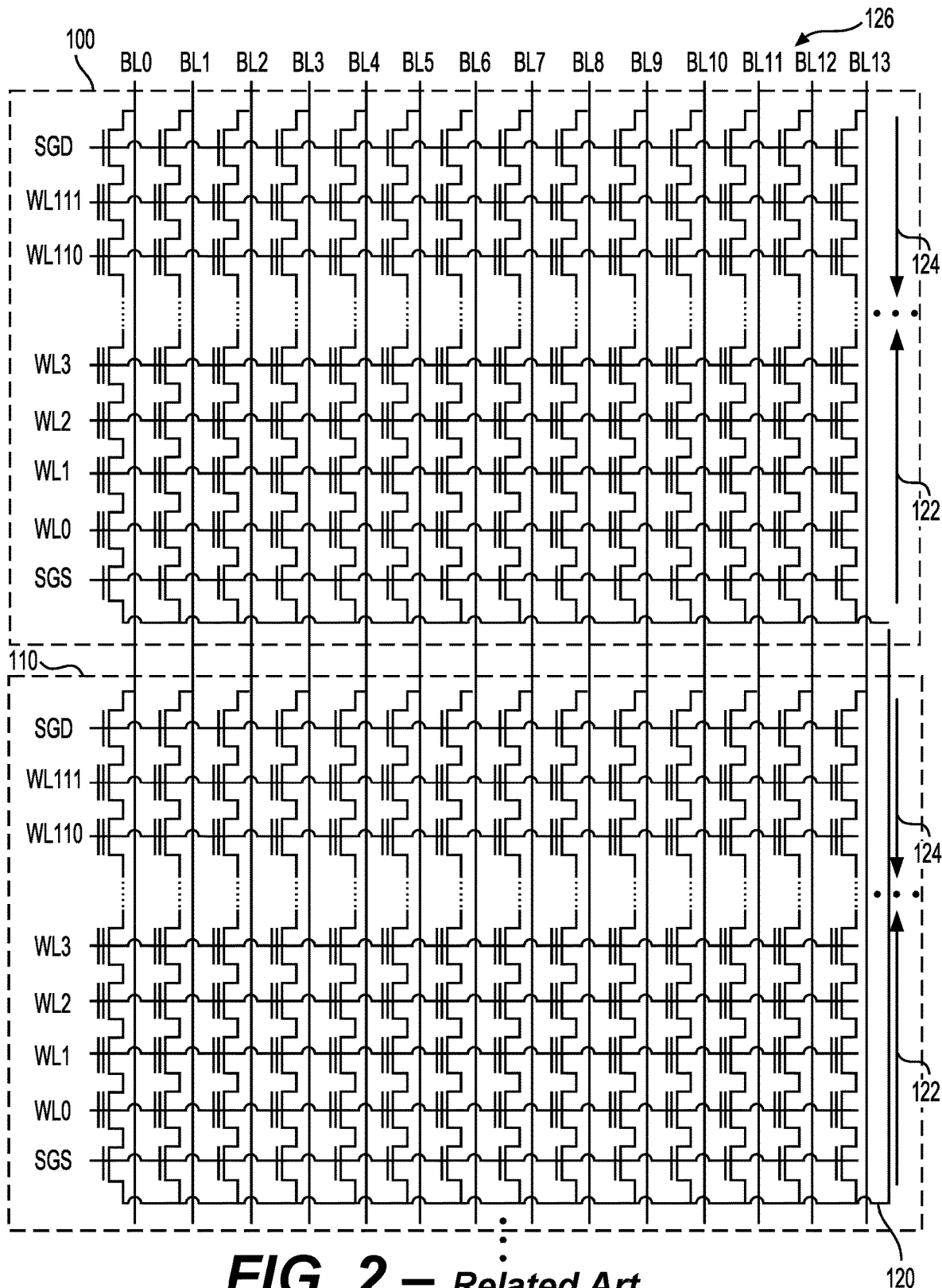
*FIG. 2* — Related Art

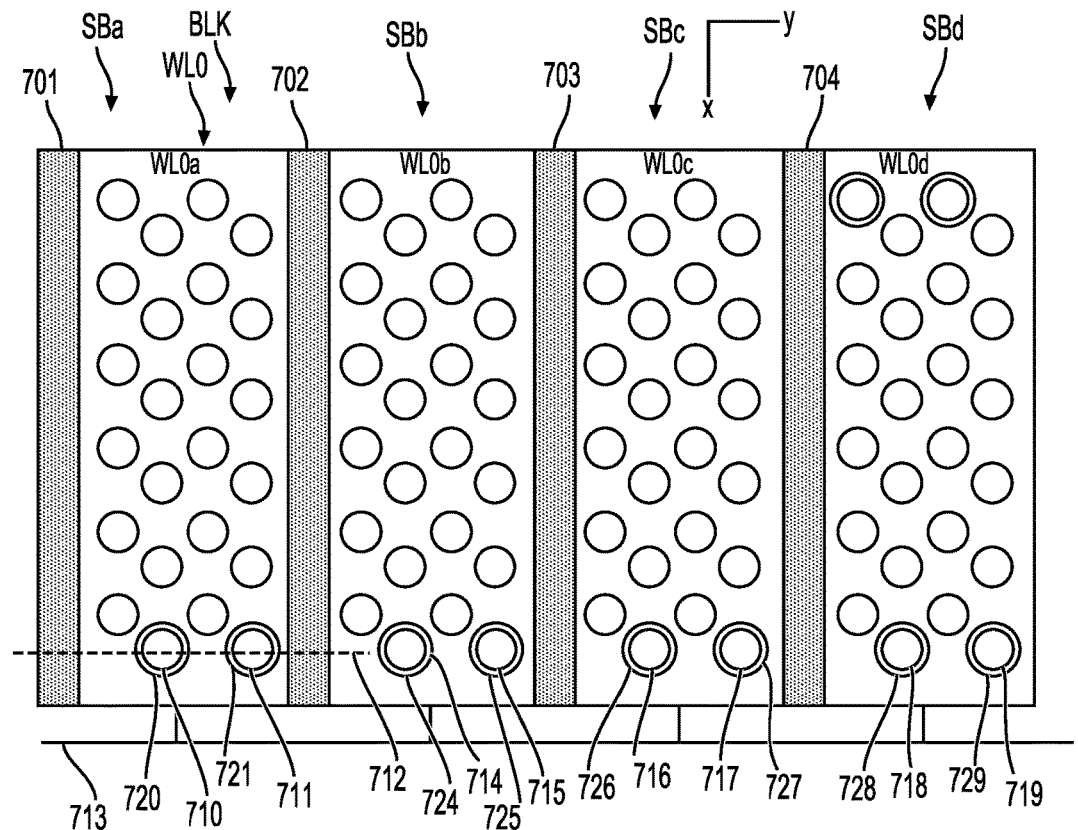
FIG. 7A - Related Art
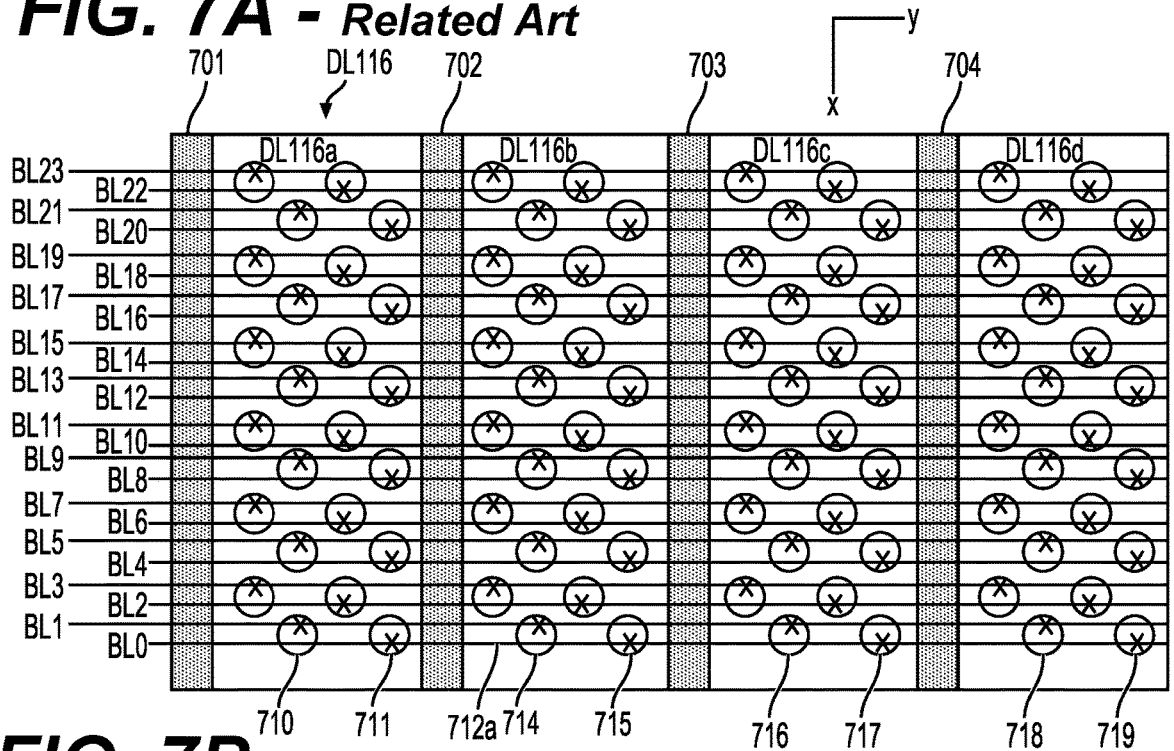
FIG. 7B - Related Art

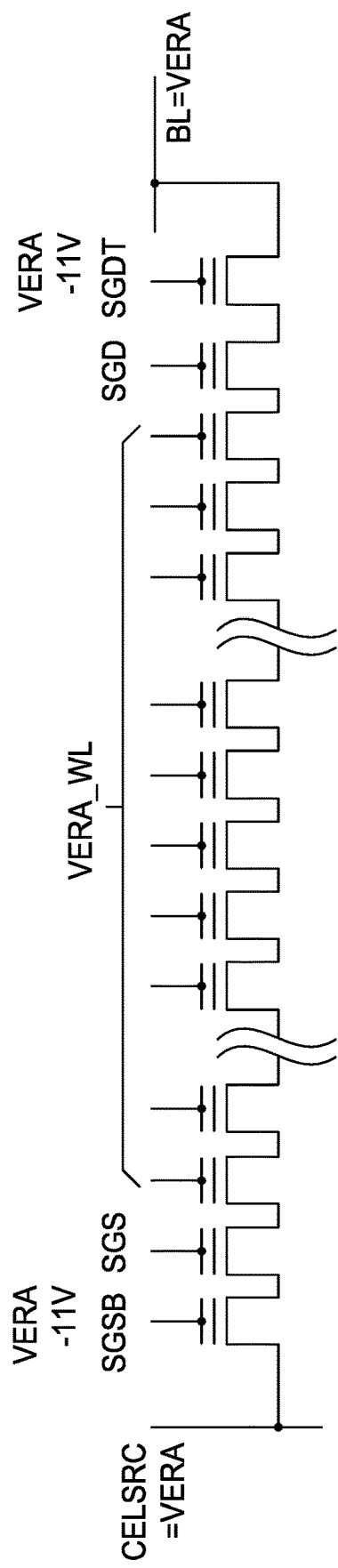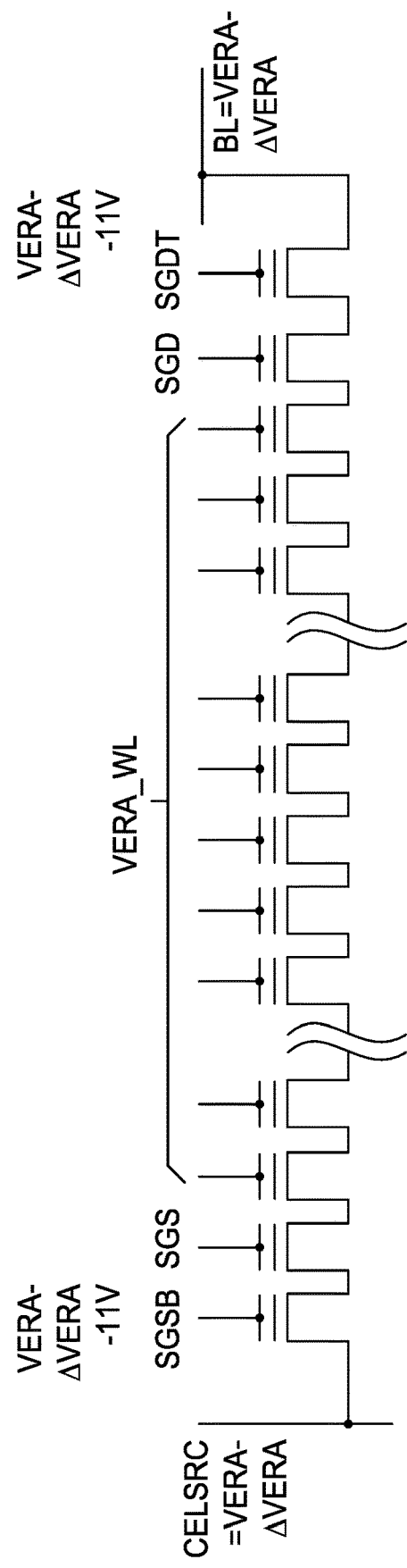

PLANE AND BLOCK LOCATION DEPENDENT VOLTAGE BIASES IN NAND MEMORY

CROSS-REFERENCE TO RELATED APPLICATIONS

This application claims the benefit of U.S. Provisional Application No. 63/462,387, filed on Apr. 27, 2023. The entire disclosure of the application referenced above is incorporated herein by reference.

BACKGROUND

1. Field

The present disclosure is related generally to the operation of non-volatile memory and more particularly to improved techniques for improving erase and programming uniformity across a plurality of planes within a chip.

2. Related Art

Semiconductor memory is widely used in various electronic devices, such as cellular telephones, digital cameras, personal digital assistants, medical electronics, mobile computing devices, servers, solid state drives, non-mobile computing devices and other devices. Semiconductor memory may comprise non-volatile memory or volatile memory. A non-volatile memory allows information to be stored and retained even when the non-volatile memory is not connected to a source of power, e.g., a battery.

NAND memory devices include a chip with a plurality of memory blocks, each of which includes an array of memory cells arranged in a plurality of word lines. Programming the memory cells of a word line to retain data typically occurs in a plurality of program loops, each of which includes the application of a programming pulse to a control gate of the word line and, optionally, a verify operation to sense the threshold voltages of the memory cells being programmed. Each program loop may also include a pre-charge operation prior to the programming pulse to pre-charge a plurality of channels containing memory cells to be programmed.

SUMMARY

One aspect of the present disclosure is related to a method of operating a memory device. The method includes the step of preparing a chip that includes at least one voltage pump and a plurality of planes. The planes have arrays of memory cells that can be programmed and erased. At least some of the planes are located at different distances from the at least one voltage pump. The method continues with the step of supplying at least one voltage to a selected plane of the plurality of planes during a programming operation or an erase pulse. At least one parameter of the at least one voltage that is supplied to the selected plane is adjusted based on a distance between the selected plane and the at least one voltage pump.

According to another aspect of the present disclosure, the at least one parameter is a ramp rate.

According to yet another aspect of the present disclosure, the at least one parameter includes a bias voltage.

According to still another aspect of the present disclosure, the at least one voltage pump includes a VERA pump and wherein the bias voltage is determined based on the distance between the selected plane and the VERA pump.

According to a further aspect of the present disclosure, the at least one voltage that is supplied to the selected plane includes an erase voltage VERA that is supplied by the VERA pump to the selected plane and wherein the erase voltage VERA is adjusted by an erase bias voltage that is determined based on a distance between the selected plane and the VERA pump.

According to yet a further aspect of the present disclosure, the at least one voltage that is adjusted by the bias voltage is supplied to at least one select gate transistor in a memory block within the selected plane during an erase operation.

According to still a further aspect of the present disclosure, the at least one voltage that is adjusted by the bias voltage is supplied to a plurality of word lines in a memory block within the selected plane during an erase operation.

According to another aspect of the present disclosure, the at least one voltage pump includes a VPGM pump and the bias voltage is determined based on a distance between the selected plane and the VPGM pump.

According to yet another aspect of the present disclosure, the at least one voltage that is supplied to the selected plane includes a VPGM voltage that is supplied by the VPGM pump and wherein the VPGM voltage is adjusted by a VPGM bias voltage that is based on the distance between the selected plane and the VPGM pump.

According to still another aspect of the present disclosure, the at least one voltage that is adjusted by the bias voltage is supplied to a plurality of unselected word lines of a memory block within the selected plane during a programming operation.

According to a further aspect of the present disclosure, the at least one voltage that is adjusted by the bias voltage is supplied to a plurality of bit lines of a memory block within the selected plane during a programming operation.

Another aspect of the present disclosure, a memory device is provided. The memory device includes a chip with at least one voltage pump and a plurality of planes. The planes have arrays of memory cells that can be programmed and erased. At least some of the planes are at different distances from the at least one voltage pump. The memory device further includes control circuitry that is configured to program and erase the memory cells. The control circuitry is further configured to supply at least one voltage to a selected plane of the plurality of planes during a programming operation or an erase pulse and adjust the at least one voltage that is supplied to the selected plane by a parameter that is determined based on a distance between the selected plane and the at least one voltage pump.

According to another aspect of the present disclosure, the parameter is a ramp rate.

According to yet another aspect of the present disclosure, the parameter is a bias voltage.

According to still another aspect of the present disclosure, the at least one voltage pump includes a VERA pump and wherein the bias voltage is determined based on the distance between the selected plane and the VERA pump.

According to a further aspect of the present disclosure, the at least one voltage that is supplied to the selected plane includes an erase voltage VERA that is supplied by the VERA pump to the selected plane and wherein the erase voltage VERA is adjusted by an erase bias voltage that is determined based on a distance between the selected plane and the VERA pump.

According to yet a further aspect of the present disclosure, the at least one voltage pump includes a VPGM pump and the bias voltage is determined based on a distance between the selected plane and the VPGM pump.

According to still a further aspect of the present disclosure, the at least one voltage that is supplied to the selected plane includes a VPGM voltage that is supplied by the VPGM pump and wherein the VPGM voltage is adjusted by a VPGM bias voltage that is based on the distance between the selected plane and the VPGM pump.

Yet another aspect of the present disclosure is related to an apparatus that includes a chip that with a VERA voltage pump, a VPGM voltage pump, and a plurality of planes. The planes have arrays of memory cells that can be programmed and erased. At least some of the planes are at different distances from the VERA voltage pump and from the VPGM voltage pump. The apparatus also includes a controlling means for programming and erasing the memory cells. The controlling means is configured to supply a VPGM voltage to a selected plane of the plurality of planes during a programming operation and being configured to supply a VERA voltage to the selected plane during an erase operation. The controlling means is also configured to adjust the VPGM voltage that is supplied to the selected plane during the programming operation by a VPGM bias voltage that is determined based on a distance between the selected plane and the VPGM voltage pump and adjust the VERA voltage that is supplied to the selected plane during the erase operation by a VERA bias voltage that is determined based on a distance between the selected plane and the VERA voltage pump.

According to another aspect of the present disclosure, a magnitude of the VPGM bias voltage increases with increasing distance between the selected plane and the VPGM pump and wherein a magnitude of the VERA bias voltage increases with increasing distance between the selected plane and the VERA pump.

BRIEF DESCRIPTION OF THE DRAWINGS

A more detailed description is set forth below with reference to example embodiments depicted in the appended figures. Understanding that these figures depict only example embodiments of the disclosure and are, therefore, not to be considered limiting of its scope. The disclosure is described and explained with added specificity and detail through the use of the accompanying drawings in which:

FIG. 1C is a block diagram of circuitry that is configured to perform the operations of the subject disclosure;

FIG. 2 depicts blocks of memory cells in an example two-dimensional configuration of the memory array of FIG. 1A;

FIG. 7A depicts a top view of an example word line layer WL0 of the stack of FIG. 6B;

FIG. 7B depicts a top view of an example top dielectric layer DL116 of the stack of FIG. 6B;

FIG. 19 is a schematic view of a NAND string in a memory block of a plane that is near the VERA pump during an erase pulse where no bias voltage is applied to the SGSB and SGDT transistors;

FIG. 20 is a schematic view of a NAND string in a memory block of a plane that is distant from the VERA pump during an erase pulse where bias voltages are applied to the SGSB and SGDT transistors;

DESCRIPTION OF THE ENABLING EMBODIMENTS

An aspect of the present disclosure is related to improved programming and erasing techniques which allow for improved programming and erasing consistency across multiple planes in a chip. To improve erase consistency, when applying an erase pulse to a memory block being erased, circuitry in the memory device automatically applies a bias voltage, which is determined based on the distance between the memory block being erased and a VERA pump in the chip, to one or more voltages that are supplied to the memory block being erased. The bias voltage either slows erasing in a memory block that is very near the VERA pump or speeds up erasing in a memory block that is distant from the VERA pump so that all memory blocks are erased at approximately the same rate. Similarly, to improve programming consistency, when applying a programming pulse to a word line that contains memory cells which are being programmed, the circuitry automatically applies a bias voltage to one or more voltages that are supplied to the memory block being programmed. The bias voltage is determined based on the distance between the memory block containing the word line being programmed and a VPGM pump in the chip and either slows programming in a memory block that is very close to the VPGM pump or speeds up programming in a memory block that is distant from the VPGM pump so that all memory blocks are programmed at approximately the same rate.

Figure 1A:
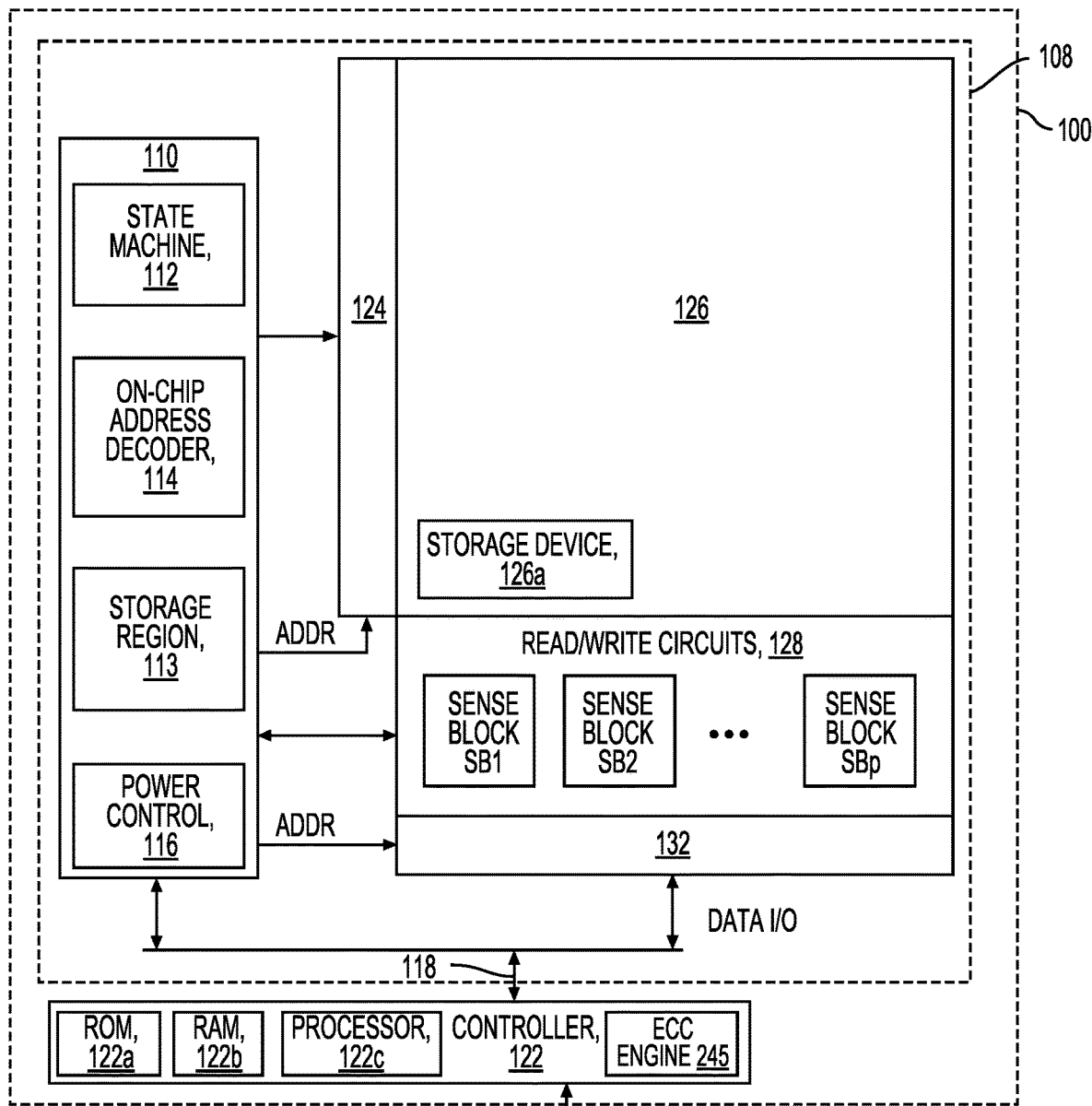
FIG. 1A is a block diagram of an example memory device.

FIG. 1A is a block diagram of an example memory device 100 is configured to operate according to the erasing techniques and the programming techniques of the present disclosure. The memory die 108 includes a memory structure 126 of memory cells, such as an array of memory cells, control circuitry 110, and read/write circuits 128. The memory structure 126 is addressable by word lines via a row decoder 124 and by bit lines via a column decoder 132. The read/write circuits 128 include multiple sense blocks SB1, SB2, . . . . SBp (sensing circuitry) and allow a page of memory cells to be read or programmed in parallel. Typically, a controller 122 is included in the same memory device 100 (e.g., a removable storage card) as the one or more memory die 108. Commands and data are transferred between the host 140 and controller 122 via a data bus 120, and between the controller and the one or more memory die 108 via lines 118.

The memory structure 126 can be two-dimensional or three-dimensional. The memory structure 126 may comprise one or more array of memory cells including a three-dimensional array. The memory structure 126 may comprise a monolithic three-dimensional memory structure in which multiple memory levels are formed above (and not in) a single substrate, such as a wafer, with no intervening substrates. The memory structure 126 may comprise any type of non-volatile memory that is monolithically formed in one or more physical levels of arrays of memory cells having an active area disposed above a silicon substrate. The memory structure 126 may be in a non-volatile memory device having circuitry associated with the operation of the memory cells, whether the associated circuitry is above or within the substrate.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations.

A storage region 113 may, for example, be provided for programming parameters. The programming parameters may include a program voltage, a program voltage bias, position parameters indicating positions of memory cells, contact line connector thickness parameters, a verify voltage, and/or the like. The position parameters may indicate a position of a memory cell within the entire array of NAND strings, a position of a memory cell as being within a particular NAND string group, a position of a memory cell on a particular plane, and/or the like. The contact line connector thickness parameters may indicate a thickness of a contact line connector, a substrate or material that the contact line connector is comprised of, and/or the like.

The on-chip address decoder 114 provides an address interface between that used by the host or a memory controller to the hardware address used by the decoders 124 and 132. The power control module 116 controls the power and voltages supplied to the word lines and bit lines during memory operations. It can include drivers for word lines, SGS and SGD transistors, and source lines. The sense blocks can include bit line drivers, in one approach. An SGS transistor is a select gate transistor at a source end of a NAND string, and an SGD transistor is a select gate transistor at a drain end of a NAND string.

In some embodiments, some of the components can be combined. In various designs, one or more of the components (alone or in combination), other than memory structure 126, can be thought of as at least one control circuit which is configured to perform the actions described herein. For example, a control circuit may include any one of, or a combination of, control circuitry 110, state machine 112, decoders 114/132, power control module 116, sense blocks SBb, SB2, . . . , SBp, read/write circuits 128, controller 122, and so forth.

The control circuits 150 can include a programming circuit 151 configured to perform a program and verify operation for one set of memory cells, wherein the one set of memory cells comprises memory cells assigned to represent one data state among a plurality of data states and memory cells assigned to represent another data state among the plurality of data states; the program and verify operation comprising a plurality of program and verify iterations; and in each program and verify iteration, the programming circuit performs programming for the one selected word line after which the programming circuit applies a verification signal to the selected word line. The control circuits 150 can also include a counting circuit 152 configured to obtain a count of memory cells which pass a verify test for the one data state. The control circuits 150 can also include a determination circuit 153 configured to determine, based on an amount by which the count exceeds a threshold, if a programming operation is completed.

Figure 1B:
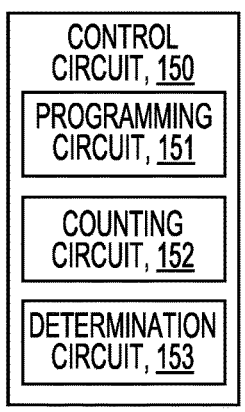
FIG. 1B is a block diagram of an example control circuit.

For example, FIG. 1B is a block diagram of an example control circuit 150 which comprises the programming circuit 151, the counting circuit 152, and the determination circuit 153.

The off-chip controller 122 may comprise a processor 122c, storage devices (memory) such as ROM 122a and RAM 122b and an error-correction code (ECC) engine 245. The ECC engine can correct a number of read errors which are caused when the upper tail of a Vth distribution becomes too high. However, uncorrectable errors may exist in some cases. The techniques provided herein reduce the likelihood of uncorrectable errors.

The storage device(s) 122a, 122b comprise, code such as a set of instructions, and the processor 122c is operable to execute the set of instructions to provide the functionality described herein. Alternately or additionally, the processor 122c can access code from a storage device 126a of the memory structure 126, such as a reserved area of memory cells in one or more word lines. For example, code can be used by the controller 122 to access the memory structure 126 such as for programming, read and erase operations. The code can include boot code and control code (e.g., set of instructions). The boot code is software that initializes the controller 122 during a booting or startup process and enables the controller 122 to access the memory structure 126. The code can be used by the controller 122 to control one or more memory structures 126. Upon being powered up, the processor 122c fetches the boot code from the ROM 122a or storage device 126a for execution, and the boot code initializes the system components and loads the control code into the RAM 122b. Once the control code is loaded into the RAM 122b, it is executed by the processor 122c. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below and provide the voltage waveforms including those discussed further below. For example, as illustrated in FIG. 1C, the control circuitry 110, the controller 122, and/or the control circuits 150 are configured to program and/or erase memory cells according to the unique programming and erasing techniques discussed herein. At step 1000, a program or erase command is received. At step 1002, a memory block to program or erase is selected. At step 1004, at least one bias voltage and/or ramp rate is selected based on a distance between the memory block and a VPGM pump or based on a distance between the memory block and a VERA pump. At step 1006, the memory cells are either programmed or erased while at least one voltage supplied to the selected memory block is adjusted by the at least one bias voltage. These erasing and programming techniques are discussed in further detail below.

In one embodiment, the host is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple memory strings in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the z-direction is substantially perpendicular and the x- and y-directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional array of NAND strings, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

FIG. 2 illustrates memory blocks 200, 210 of memory cells in an example two-dimensional configuration of the memory array 126 of FIG. 1. The memory array 126 can include many such blocks 200, 210. Each example block 200, 210 includes a number of NAND strings and respective bit lines, e.g., BL0, BL1, . . . which are shared among the blocks. Each NAND string is connected at one end to a drain-side select gate (SGD), and the control gates of the drain-side select gates are connected via a common SGD line. The NAND strings are connected at their other end to a source-side select gate (SGS) which, in turn, is connected to a common source line 220. One hundred and twelve word lines, for example, WL0-WL111, extend between the SGSs and the SGDs. In some embodiments, the memory block may include more or fewer than one hundred and twelve word lines. For example, in some embodiments, a memory block includes one hundred and sixty-four word lines. In some cases, dummy word lines, which contain no user data, can also be used in the memory array adjacent to the select gate transistors or between certain data word lines. Such dummy word lines can shield the edge data word line from certain edge effects.

Figure 3A:
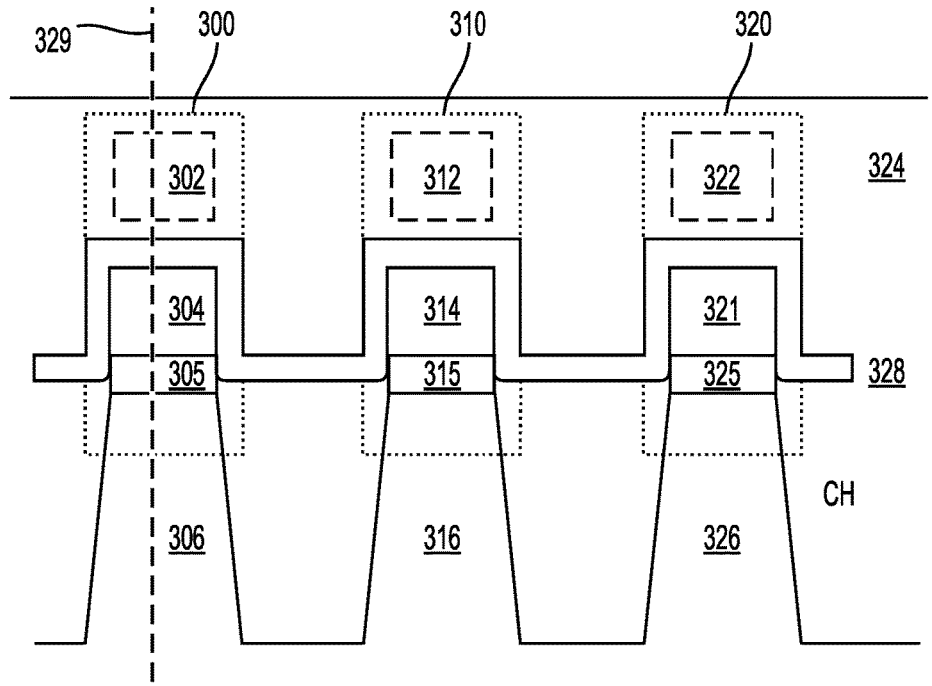
FIG. 3A and FIG. 3B depict cross-sectional views of example floating gate memory cells in NAND strings.
Figure 3B:
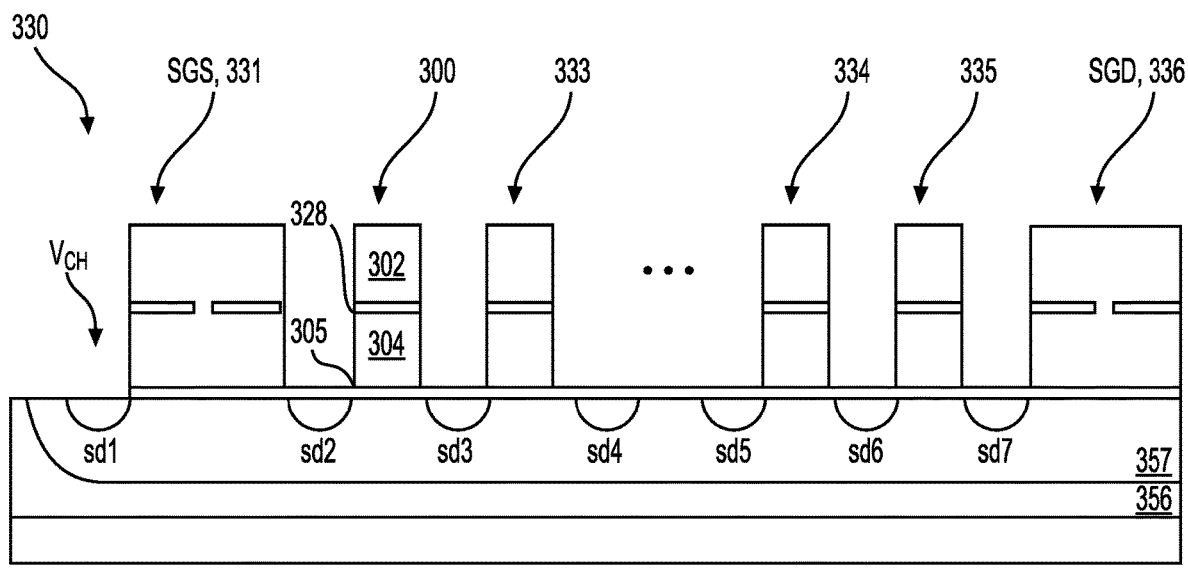

One type of non-volatile memory which may be provided in the memory array is a floating gate memory, such as of the type shown in FIGS. 3A and 3B. However, other types of non-volatile memory can also be used. As discussed in further detail below, in another example shown in FIGS. 4A and 4B, a charge-trapping memory cell uses a non-conductive dielectric material in place of a conductive floating gate to store charge in a non-volatile manner. A triple layer dielectric formed of silicon oxide, silicon nitride and silicon oxide ("ONO") is sandwiched between a conductive control gate and a surface of a semi-conductive substrate above the memory cell channel. The cell is programmed by injecting electrons from the cell channel into the nitride, where they are trapped and stored in a limited region. This stored charge then changes the threshold voltage of a portion of the channel of the cell in a manner that is detectable. The cell is erased by injecting hot holes into the nitride. A similar cell can be provided in a split-gate configuration where a doped polysilicon gate extends over a portion of the memory cell channel to form a separate select transistor.

In another approach, NROM cells are used. Two bits, for example, are stored in each NROM cell, where an ONO dielectric layer extends across the channel between source and drain diffusions. The charge for one data bit is localized in the dielectric layer adjacent to the drain, and the charge for the other data bit localized in the dielectric layer adjacent to the source. Multi-state data storage is obtained by separately reading binary states of the spatially separated charge storage regions within the dielectric. Other types of non-volatile memory are also known.

FIG. 3A illustrates a cross-sectional view of example floating gate memory cells 300, 310, 320 in NAND strings. In this Figure, a bit line or NAND string direction goes into the page, and a word line direction goes from left to right. As an example, word line 324 extends across NAND strings which include respective channel regions 306, 316 and 326. The memory cell 300 includes a control gate 302, a floating gate 304, a tunnel oxide layer 305 and the channel region 306. The memory cell 310 includes a control gate 312, a floating gate 314, a tunnel oxide layer 315 and the channel region 316. The memory cell 320 includes a control gate 322, a floating gate 321, a tunnel oxide layer 325 and the channel region 326. Each memory cell 300, 310, 320 is in a different respective NAND string. An inter-poly dielectric (IPD) layer 328 is also illustrated. The control gates 302, 312, 322 are portions of the word line. A cross-sectional view along contact line connector 329 is provided in FIG. 3B.

The control gate 302, 312, 322 wraps around the floating gate 304, 314, 321, increasing the surface contact area between the control gate 302, 312, 322 and floating gate 304, 314, 321. This results in higher IPD capacitance, leading to a higher coupling ratio which makes programming and erase easier. However, as NAND memory devices are scaled down, the spacing between neighboring cells 300, 310, 320 becomes smaller so there is almost no space for the control gate 302, 312, 322 and the IPD layer 328 between two adjacent floating gates 302, 312, 322.

Figure 4A:
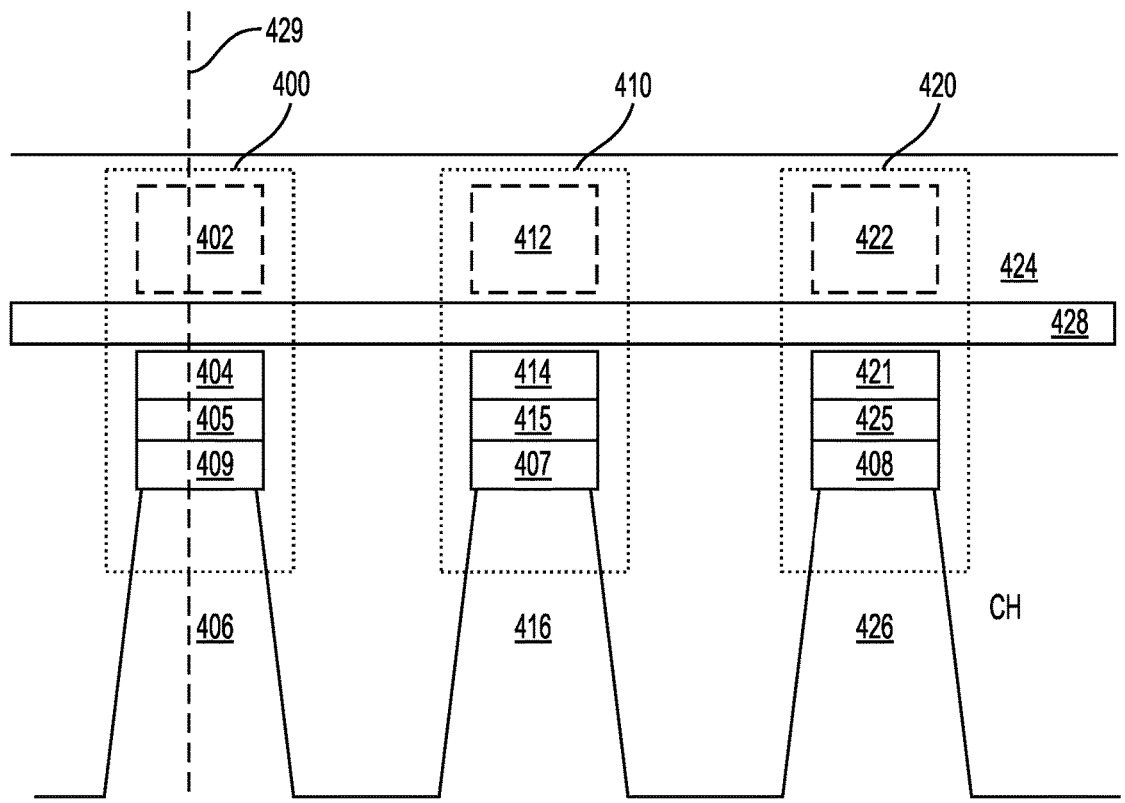
FIG. 4A and FIG. 4B depict cross-sectional views of example charge-trapping memory cells in NAND strings.
Figure 4B:
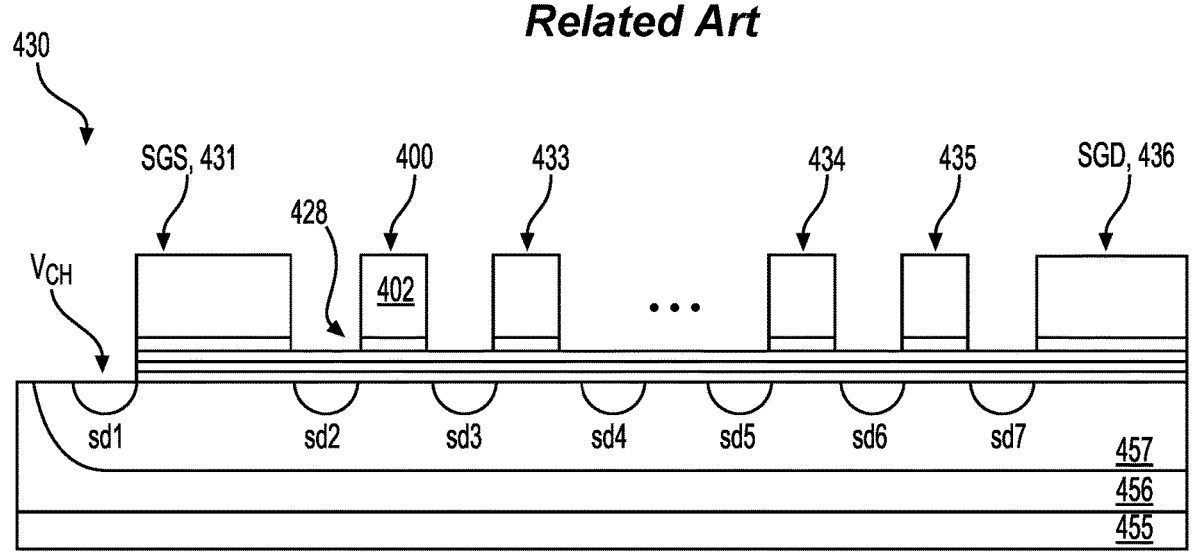

As an alternative, as shown in FIGS. 4A and 4B, the flat or planar memory cell 400, 410, 420 has been developed in which the control gate 402, 412, 422 is flat or planar; that is, it does not wrap around the floating gate and its only contact with the charge storage layer 428 is from above it. In this case, there is no advantage in having a tall floating gate. Instead, the floating gate is made much thinner. Further, the floating gate can be used to store charge, or a thin charge trap layer can be used to trap charge. This approach can avoid the issue of ballistic electron transport, where an electron can travel through the floating gate after tunneling through the tunnel oxide during programming.

FIG. 4A depicts a cross-sectional view of example charge-trapping memory cells 400, 410, 420 in NAND strings. The view is in a word line direction of memory cells 400, 410, 420 comprising a flat control gate and charge-trapping regions as a two-dimensional example of memory cells 400, 410, 420 in the memory cell array 126 of FIG. 1. Charge-trapping memory can be used in NOR and NAND flash memory device. This technology uses an insulator such as an SiN film to store electrons, in contrast to a floating-gate MOSFET technology which uses a conductor such as doped polycrystalline silicon to store electrons. As an example, a word line 424 extends across NAND strings which include respective channel regions 406, 416, 426. Portions of the word line provide control gates 402, 412, 422. Below the word line is an IPD layer 428, charge-trapping layers 404, 414, 421, polysilicon layers 405, 415, 425, and tunneling layers 409, 407, 408. Each charge-trapping layer 404, 414, 421 extends continuously in a respective NAND string. The flat configuration of the control gate can be made thinner than a floating gate. Additionally, the memory cells can be placed closer together.

FIG. 4B illustrates a cross-sectional view of the structure of FIG. 4A along contact line connector 429. The NAND string 430 includes an SGS transistor 431, example memory cells 400, 433, . . . 435, and an SGD transistor 436. Passageways in the IPD layer 428 in the SGS and SGD transistors 431, 436 allow the control gate layers 402 and floating gate layers to communicate. The control gate 402 and floating gate layers may be polysilicon and the tunnel oxide layer may be silicon oxide, for instance. The IPD layer 428 can be a stack of nitrides (N) and oxides (O) such as in a N-O-N-O-N configuration.

The NAND string may be formed on a substrate which comprises a p-type substrate region 455, an n-type well 456 and a p-type well 457. N-type source/drain diffusion regions sd1, sd2, sd3, sd4, sd5, sd6 and sd7 are formed in the p-type well. A channel voltage, Vch, may be applied directly to the channel region of the substrate.

Figure 5:
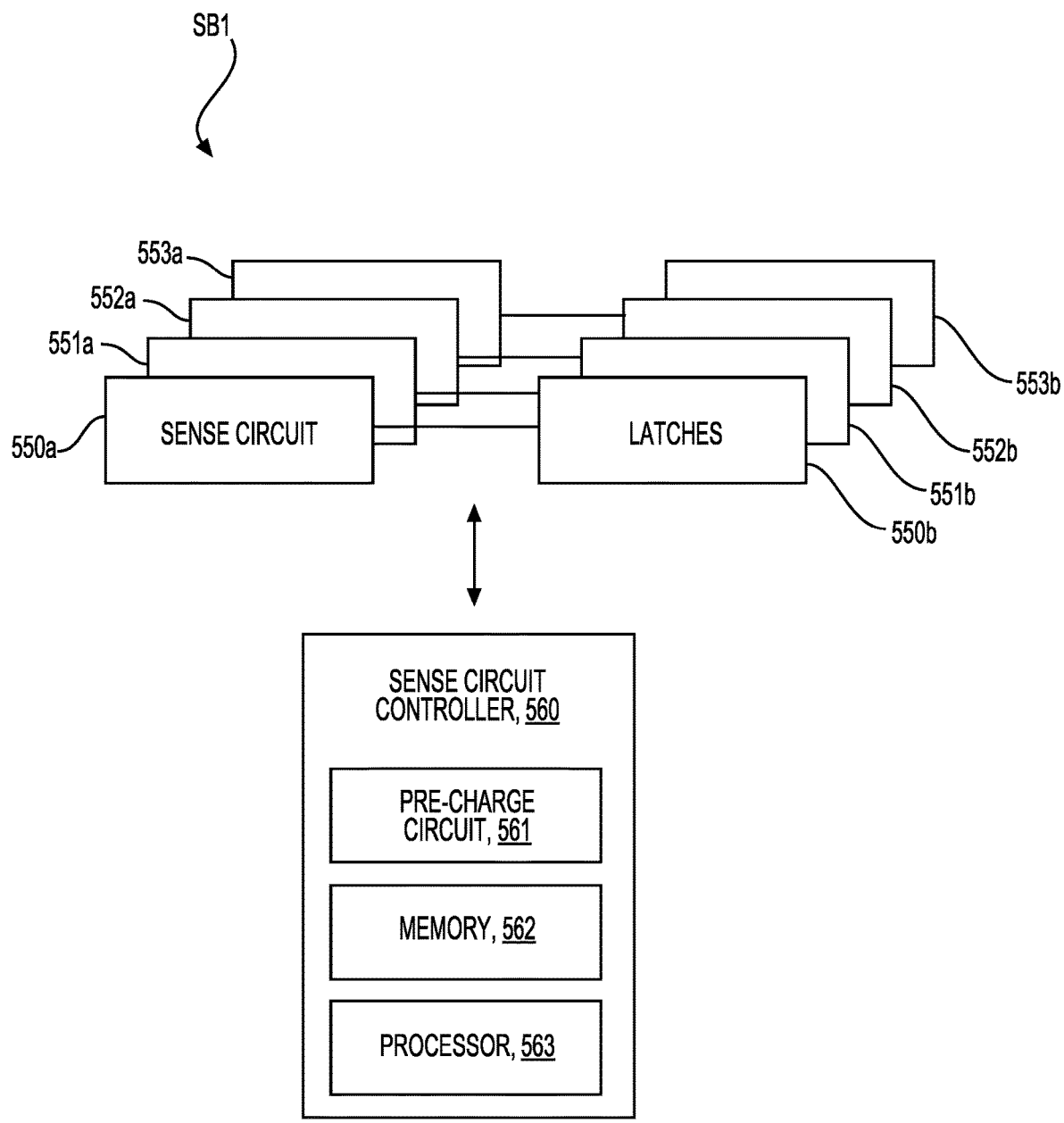
FIG. 5 depicts an example block diagram of the sense block SB1 of FIG. 1.

FIG. 5 illustrates an example block diagram of the sense block SB1 of FIG. 1. In one approach, a sense block comprises multiple sense circuits. Each sense circuit is associated with data latches. For example, the example sense circuits 550a, 551a, 552a, and 553a are associated with the data latches 550b, 551b, 552b, and 553b, respectively. In one approach, different subsets of bit lines can be sensed using different respective sense blocks. This allows the processing load which is associated with the sense circuits to be divided up and handled by a respective processor in each sense block. For example, a sense circuit controller 560 in SB1 can communicate with the set of sense circuits and latches. The sense circuit controller 560 may include a pre-charge circuit 561 which provides a voltage to each sense circuit for setting a pre-charge voltage. In one possible approach, the voltage is provided to each sense circuit independently, e.g., via the data bus and a local bus. In another possible approach, a common voltage is provided to each sense circuit concurrently. The sense circuit controller 560 may also include a pre-charge circuit 561, a memory 562 and a processor 563. The memory 562 may store code which is executable by the processor to perform the functions described herein. These functions can include reading the latches 550b, 551b, 552b, 553b which are associated with the sense circuits 550a, 551a, 552a, 553a, setting bit values in the latches and providing voltages for setting pre-charge levels in sense nodes of the sense circuits 550a, 551a, 552a, 553a. Further example details of the sense circuit controller 560 and the sense circuits 550a, 551a, 552a, 553a are provided below.

In some embodiments, a memory cell may include a flag register that includes a set of latches storing flag bits. In some embodiments, a quantity of flag registers may correspond to a quantity of data states. In some embodiments, one or more flag registers may be used to control a type of verification technique used when verifying memory cells. In some embodiments, a flag bit's output may modify associated logic of the device, e.g., address decoding circuitry, such that a specified block of cells is selected. A bulk operation (e.g., an erase operation, etc.) may be carried out using the flags set in the flag register, or a combination of the flag register with the address register, as in implied addressing, or alternatively by straight addressing with the address register alone.

Figure 6A:
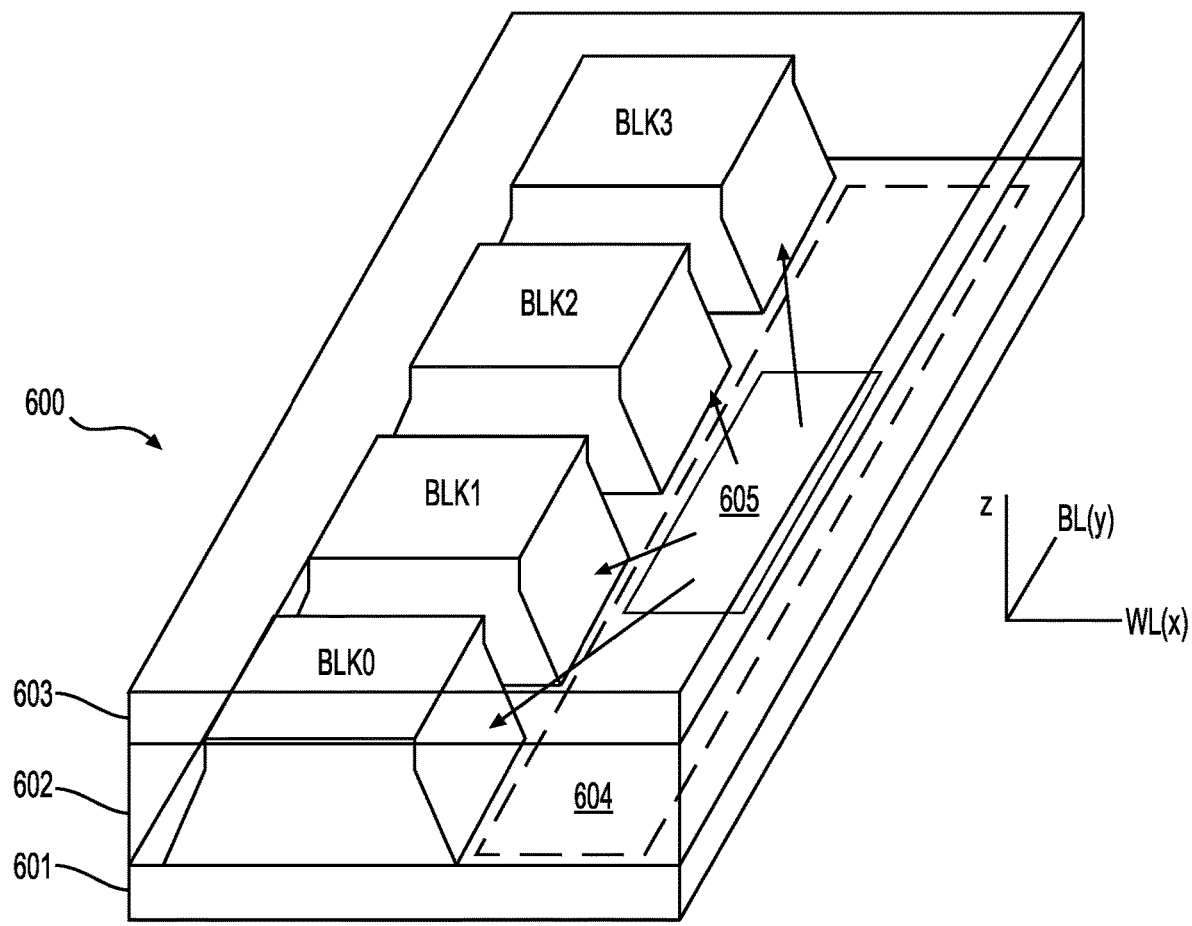
FIG. 6A is a perspective view of a set of blocks in an example three-dimensional configuration of the memory array of FIG. 1.

FIG. 6A is a perspective view of a set of blocks 600 in an example three-dimensional configuration of the memory array 126 of FIG. 1. On the substrate are example blocks BLK0, BLK1, BLK2, BLK3 of memory cells (storage elements) and a peripheral area 604 with circuitry for use by the blocks BLK0, BLK1, BLK2, BLK3. For example, the circuitry can include voltage drivers 605 which can be connected to control gate layers of the blocks BLK0, BLK1, BLK2, BLK3. In one approach, control gate layers at a common height in the blocks BLK0, BLK1, BLK2, BLK3 are commonly driven. The substrate 601 can also carry circuitry under the blocks BLK0, BLK1, BLK2, BLK3, along with one or more lower metal layers which are patterned in conductive paths to carry signals of the circuitry. The blocks BLK0, BLK1, BLK2, BLK3 are formed in an intermediate region 602 of the memory device. In an upper region 603 of the memory device, one or more upper metal layers are patterned in conductive paths to carry signals of the circuitry. Each block BLK0, BLK1, BLK2, BLK3 comprises a stacked area of memory cells, where alternating levels of the stack represent word lines. In one possible approach, each block BLK0, BLK1, BLK2, BLK3 has opposing tiered sides from which vertical contacts extend upward to an upper metal layer to form connections to conductive paths. While four blocks BLK0, BLK1, BLK2, BLK3 are illustrated as an example, two or more blocks can be used, extending in the x- and/or y-directions.

In one possible approach, the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of the memory device.

Figure 6B:
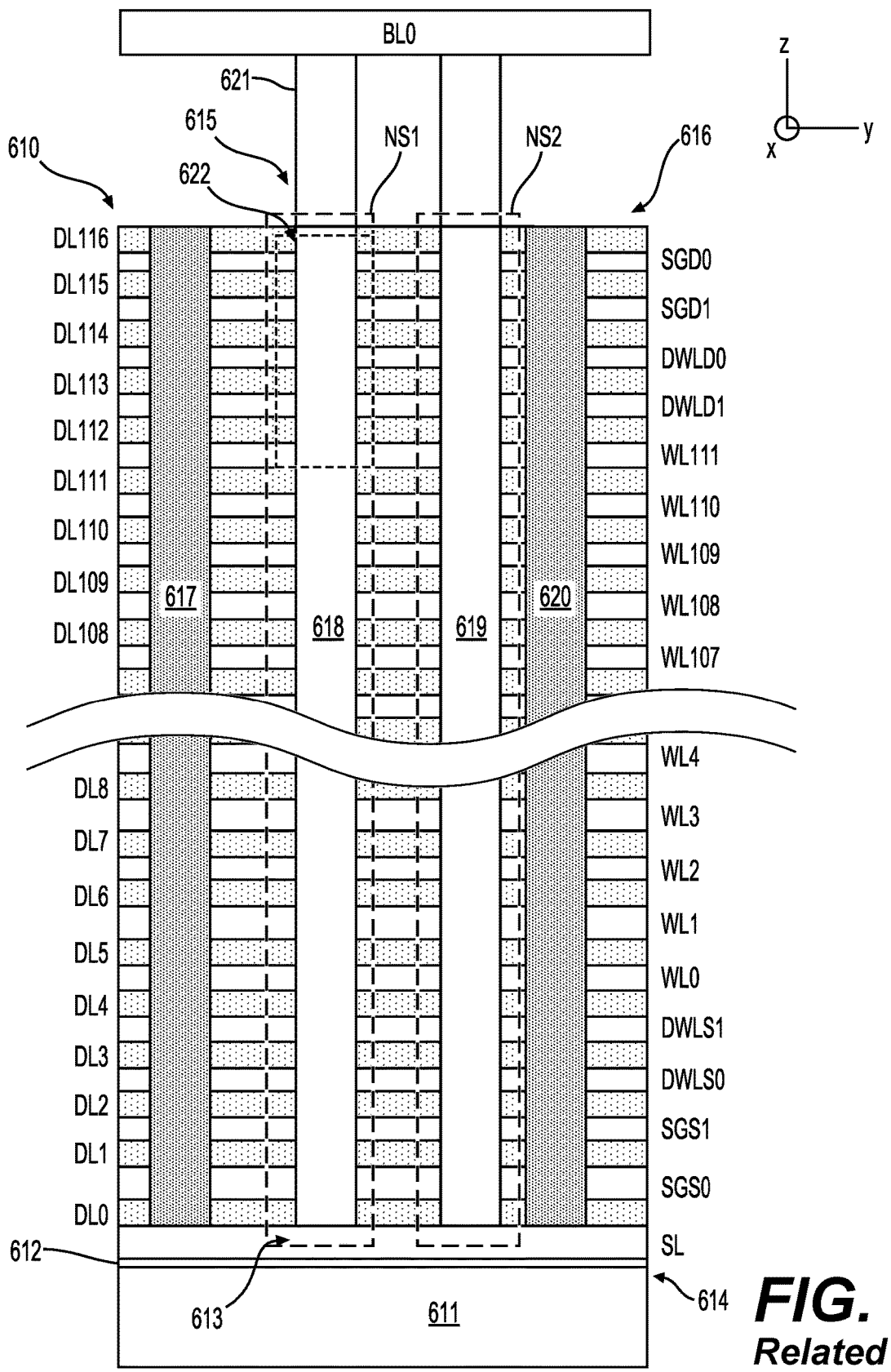
FIG. 6B depicts an example cross-sectional view of a portion of one of the blocks of FIG. 6A.

FIG. 6B illustrates an example cross-sectional view of a portion of one of the blocks BLK0, BLK1, BLK2, BLK3 of FIG. 6A. The block comprises a stack 610 of alternating conductive and dielectric layers. In this example, the conductive layers comprise two SGD layers, two SGS layers and four dummy word line layers DWLD0, DWLD1, DWLS0 and DWLS1, in addition to data word line layers (word lines) WL0-WL111. The dielectric layers are labelled as DL0-DL116. Further, regions of the stack 610 which comprise NAND strings NS1 and NS2 are illustrated. Each NAND string encompasses a memory hole 618, 619 which is filled with materials which form memory cells adjacent to the word lines. A region 622 of the stack 610 is shown in greater detail in FIG. 6D and is discussed in further detail below. The dielectric layers can have variable thicknesses such that some of the conductive layers can be closer to or further from neighboring conductive layers. The thicknesses of the dielectric layers affects the "ON pitch," which is a factor in memory density. Specifically, a smaller ON pitch allows for more memory cells in a given area but may compromise reliability.

The 610 stack includes a substrate 611, an insulating film 612 on the substrate 611, and a portion of a source line SL. NS1 has a source-end 613 at a bottom 614 of the stack and a drain-end 615 at a top 616 of the stack 610. Contact line connectors (e.g., slits, such as metal-filled slits) 617, 620 may be provided periodically across the stack 610 as interconnects which extend through the stack 610, such as to connect the source line to a particular contact line above the stack 610. The contact line connectors 617, 620 may be used during the formation of the word lines and subsequently filled with metal. A portion of a bit line BL0 is also illustrated. A conductive via 621 connects the drain-end 615 to BL0.

Figure 6C:
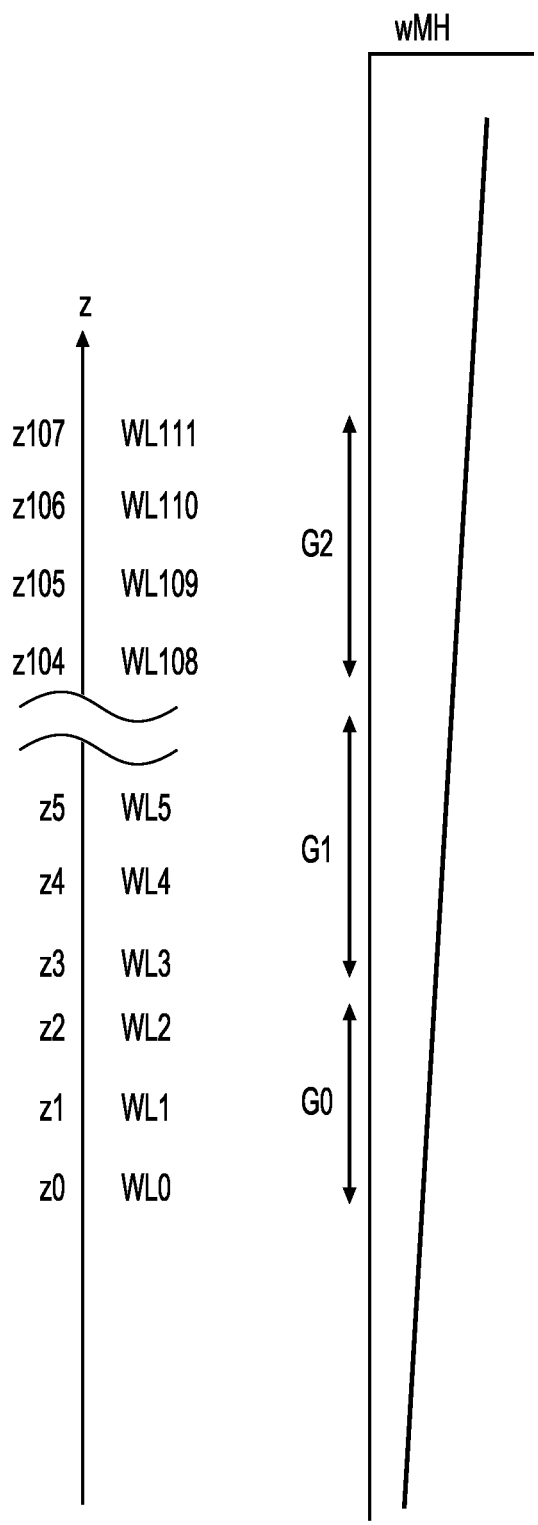
FIG. 6C depicts a plot of memory hole diameter in the stack of FIG. 6B.

FIG. 6C illustrates a plot of memory hole diameter in the stack of FIG. 6B. The vertical axis is aligned with the stack of FIG. 6B and illustrates a width (wMH), e.g., diameter, of the memory holes 618 and 619. The word line layers WL0-WL111 of FIG. 6A are repeated as an example and are at respective heights z0-z111 in the stack. In such a memory device, the memory holes which are etched through the stack have a very high aspect ratio. For example, a depth-to-diameter ratio of about 25-30 is common. The memory holes may have a circular cross-section. Due to the etching process, the memory hole width can vary along the length of the hole. Typically, the diameter becomes progressively smaller from the top to the bottom of the memory hole. That is, the memory holes are tapered, narrowing at the bottom of the stack. In some cases, a slight narrowing occurs at the top of the hole near the select gate so that the diameter becomes slightly wider before becoming progressively smaller from the top to the bottom of the memory hole.

Due to the non-uniformity in the width of the memory hole, the programming speed, including the program slope and erase speed of the memory cells can vary based on their position along the memory hole, e.g., based on their height in the stack. With a smaller diameter memory hole, the electric field across the tunnel oxide is relatively stronger, so that the programming and erase speed is relatively higher.

One approach is to define groups of adjacent word lines for which the memory hole diameter is similar, e.g., within a defined range of diameter, and to apply an optimized verify scheme for each word line in a group. Different groups can have different optimized verify schemes.

Figure 6D:
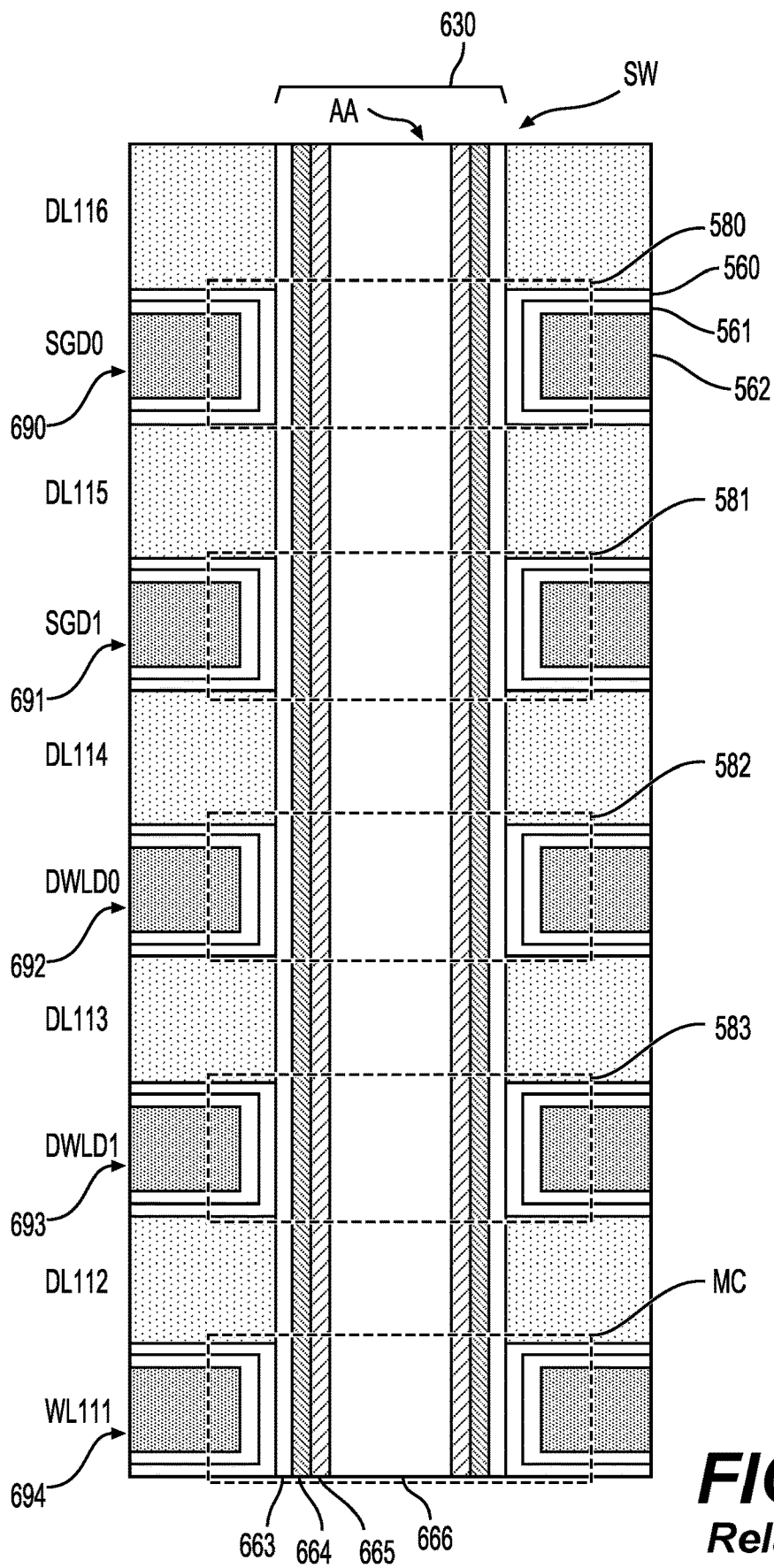
FIG. 6D depicts a close-up view of region 622 of the stack of FIG. 6B.

FIG. 6D illustrates a close-up view of the region 622 of the stack 610 of FIG. 6B. Memory cells are formed at the different levels of the stack at the intersection of a word line layer and a memory hole. In this example, SGD transistors 680, 681 are provided above dummy memory cells 682, 683 and a data memory cell MC. A number of layers can be deposited along the sidewall (SW) of the memory hole 630 and/or within each word line layer, e.g., using atomic layer deposition. For example, each column (e.g., the pillar which is formed by the materials within a memory hole 630) can include a charge-trapping layer or film 663 such as SiN or other nitride, a tunneling layer 664, a polysilicon body or channel 665, and a dielectric core 666. A word line layer can include a blocking oxide/block high-k material 660, a metal barrier 661, and a conductive metal 662 such as Tungsten as a control gate. For example, control gates 690, 691, 692, 693, and 694 are provided. In this example, all of the layers except the metal are provided in the memory hole 630. In other approaches, some of the layers can be in the control gate layer. Additional pillars are similarly formed in the different memory holes. A pillar can form a columnar active area (AA) of a NAND string.

When a memory cell is programmed, electrons are stored in a portion of the charge-trapping layer which is associated with the memory cell. These electrons are drawn into the charge-trapping layer from the channel, and through the tunneling layer. The Vth of a memory cell is increased in proportion to the amount of stored charge. During an erase operation, the electrons return to the channel.

Each of the memory holes 630 can be filled with a plurality of annular layers comprising a blocking oxide layer, a charge trapping layer 663, a tunneling layer 664 and a channel layer. A core region of each of the memory holes 630 is filled with a body material, and the plurality of annular layers are between the core region and the word line in each of the memory holes 630.

The NAND string can be considered to have a floating body channel because the length of the channel is not formed on a substrate. Further, the NAND string is provided by a plurality of word line layers above one another in a stack, and separated from one another by dielectric layers.

FIG. 7A illustrates a top view of an example word line layer WL0 of the stack 610 of FIG. 6B. As mentioned, a three-dimensional memory device can comprise a stack of alternating conductive and dielectric layers. The conductive layers provide the control gates of the SG transistors and memory cells. The layers used for the SG transistors are SG layers and the layers used for the memory cells are word line layers. Further, memory holes are formed in the stack and filled with a charge-trapping material and a channel material. As a result, a vertical NAND string is formed. Source lines are connected to the NAND strings below the stack and bit lines are connected to the NAND strings above the stack.

A block BLK in a three-dimensional memory device can be divided into sub-blocks, where each sub-block comprises a NAND string group which has a common SGD control line. For example, see the SGD lines/control gates SGD0, SGD1, SGD2 and SGD3 in the sub-blocks SBa, SBb, SBc and SBd, respectively. Further, a word line layer in a block can be divided into regions. Each region is in a respective sub-block and can extend between contact line connectors (e.g., slits) which are formed periodically in the stack to process the word line layers during the fabrication process of the memory device. This processing can include replacing a sacrificial material of the word line layers with metal. Generally, the distance between contact line connectors should be relatively small to account for a limit in the distance that an etchant can travel laterally to remove the sacrificial material, and that the metal can travel to fill a void which is created by the removal of the sacrificial material. For example, the distance between contact line connectors may allow for a few rows of memory holes between adjacent contact line connectors. The layout of the memory holes and contact line connectors should also account for a limit in the number of bit lines which can extend across the region while each bit line is connected to a different memory cell. After processing the word line layers, the contact line connectors can optionally be filed with metal to provide an interconnect through the stack.

In this example, there are four rows of memory holes between adjacent contact line connectors. A row here is a group of memory holes which are aligned in the x-direction. Moreover, the rows of memory holes are in a staggered pattern to increase the density of the memory holes. The word line layer or word line is divided into regions WL0a, WL0b, WL0c and WL0d which are each connected by a contact line 713. The last region of a word line layer in a block can be connected to a first region of a word line layer in a next block, in one approach. The contact line 713, in turn, is connected to a voltage driver for the word line layer. The region WL0a has example memory holes 710, 711 along a contact line 712. The region WL0b has example memory holes 714, 715. The region WL0c has example memory holes 716, 717. The region WL0d has example memory holes 718, 719. The memory holes are also shown in FIG. 7B. Each memory hole can be part of a respective NAND string. For example, the memory holes 710, 714, 716 and 718 can be part of NAND strings NS0_SBa, NS1_SBb, NS2_SBc, NS3_SBd, and NS4_SBe, respectively.

Each circle represents the cross-section of a memory hole at a word line layer or SG layer. Example circles shown with dashed lines represent memory cells which are provided by the materials in the memory hole and by the adjacent word line layer. For example, memory cells 720, 721 are in WL0a, memory cells 724, 725 are in WL0b, memory cells 726, 727 are in WL0c, and memory cells 728, 729 are in WL0d. These memory cells are at a common height in the stack.

Contact line connectors (e.g., slits, such as metal-filled slits) 701, 702, 703, 704 may be located between and adjacent to the edges of the regions WL0a-WL0d. The contact line connectors 701, 702, 703, 704 provide a conductive path from the bottom of the stack to the top of the stack. For example, a source line at the bottom of the stack may be connected to a conductive line above the stack, where the conductive line is connected to a voltage driver in a peripheral region of the memory device.

FIG. 7B illustrates a top view of an example top dielectric layer DL116 of the stack of FIG. 6B. The dielectric layer is divided into regions DL116a, DL116b, DL116c and DL116d. Each region can be connected to a respective voltage driver. This allows a set of memory cells in one region of a word line layer being programmed concurrently, with each memory cell being in a respective NAND string which is connected to a respective bit line. A voltage can be set on each bit line to allow or inhibit programming during each program voltage.

The region DL116a has the example memory holes 710, 711 along a contact line 712, which is coincident with a bit line BL0. A number of bit lines extend above the memory holes and are connected to the memory holes as indicated by the "X" symbols. BL0 is connected to a set of memory holes which includes the memory holes 711, 715, 717, 719. Another example bit line BL1 is connected to a set of memory holes which includes the memory holes 710, 714, 716, 718. The contact line connectors (e.g., slits, such as metal-filled slits) 701, 702, 703, 704 from FIG. 7A are also illustrated, as they extend vertically through the stack. The bit lines can be numbered in a sequence BL0-BL23 across the DL116 layer in the x-direction.

Different subsets of bit lines are connected to memory cells in different rows. For example, BL0, BL4, BL8, BL12, BL16, BL20 are connected to memory cells in a first row of cells at the right-hand edge of each region. BL2, BL6, BL10, BL14, BL18, BL22 are connected to memory cells in an adjacent row of cells, adjacent to the first row at the right-hand edge. BL3, BL7, BL11, BL15, BL19, BL23 are connected to memory cells in a first row of cells at the left-hand edge of each region. BL1, BL5, BL9, BL13, BL17, BL21 are connected to memory cells in an adjacent row of memory cells, adjacent to the first row at the left-hand edge.

Figure 8:
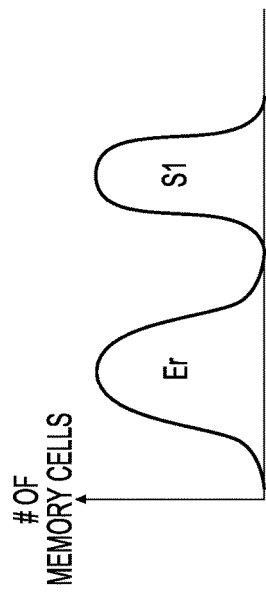
FIG. 8 depicts a threshold voltage distribution of a page of memory cells programmed to one bit per memory cell (SLC)
Figure 9:
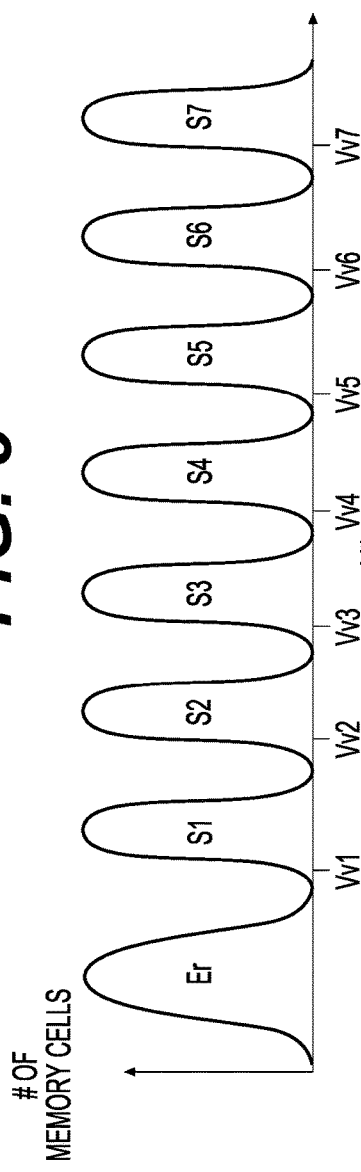
FIG. 9 depicts a threshold voltage distribution of a page of memory cells programmed to three bits per memory cell (TLC)
Figure 10:
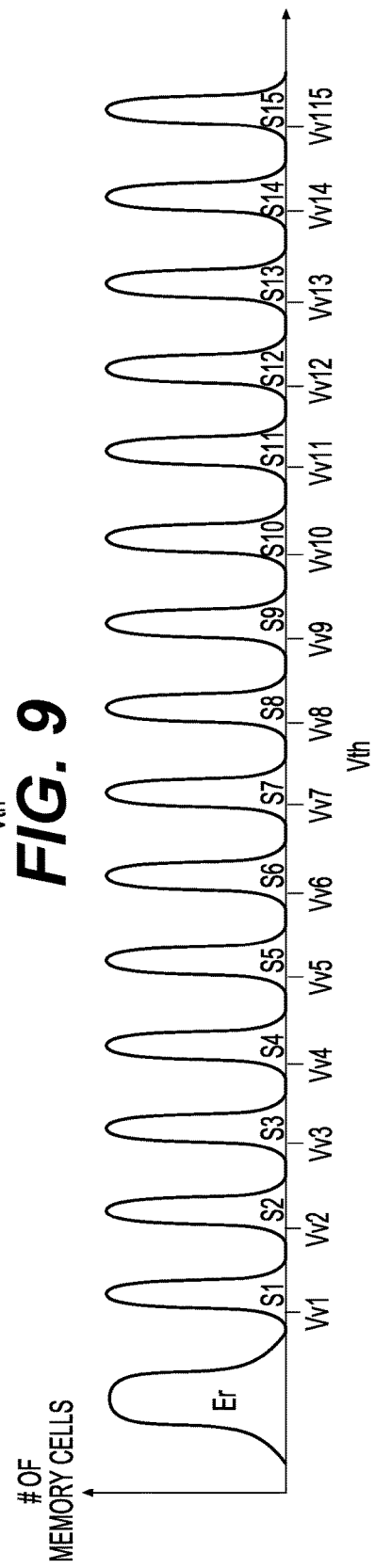
FIG. 10 depicts a threshold voltage distribution of a page of memory cells programmed to four bits per memory cell (QLC)

The memory cells of the memory blocks can be programmed to store one or more bits of data in multiple data states, each of which is associated with a respective threshold voltage Vt. For example, FIG. 8 depicts a threshold voltage Vt distribution of a group of memory cells programmed according to a one bit per memory cell (SLC) storage scheme. In the SLC storage scheme, there are two total data states, including the erased state (Er) and a single programmed data state (S1). FIG. 9 illustrates the threshold voltage Vt distribution of a three bits per cell (TLC) storage scheme that includes eight total data states, namely the erased state (Er) and seven programmed data states (S1, S2, S3, S4, S5, S6, and S7). Each programmed data state (S1-S7) is associated with a respective verify voltage (Vv1-Vv7), which is employed during a verify portion of a programming operation. FIG. 10 depicts a threshold voltage Vt distribution of a four bits per cell (QLC) storage scheme that includes sixteen total data states, namely the erased state (Er) and fifteen programmed data states (S1-S15). Other storage schemes are also available, such as two bits per cell (MLC) with four data states or five bits per cell (PLC) with thirty-two data states.

An erase operation involves transitioning the memory cells from their respective programmed data states to the erased state and typically occurs on a memory block or sub-block level rather than a word line level as is the case for programming. During the erase operation, it is desired to lower the threshold voltages Vt of the memory cells below an erase-verify level that represents an upper bound of the erased data state.

Figure 12:
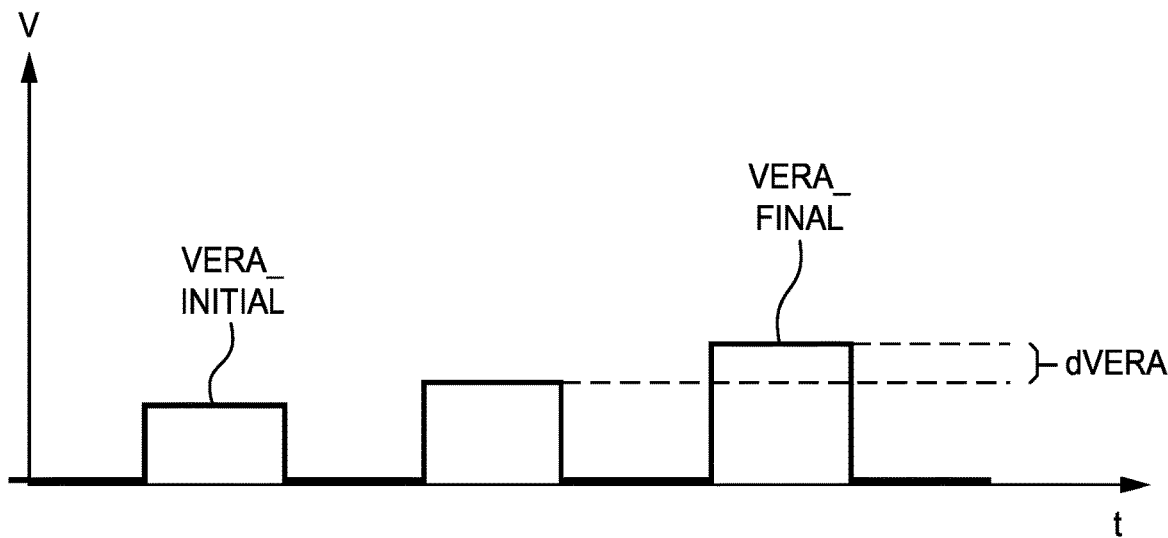
FIG. 12 is a plot depicting the erase voltage that is applied to either the source side of a memory block or the drain side of a memory block or both the source and drain sides of the memory block during a multi-loop erase operation.

With reference to FIG. 12, an erase operation can include a number of erase loops, each including an erase portion followed by a verify portion. In the erase portion, the circuitry of the memory device is configured to apply an erase voltage VERA to the channels of NAND strings in the memory block while applying a very low voltage (for example, zero Volts) to the word lines of the memory block to provide a positive channel-to-gate voltage for the memory cells of the block that drives electrons out of the charge storing materials of the memory cells or drives holes into the charge storing materials of the memory cells, thereby lowering the threshold voltages Vt of those memory cells. In the verify portion, a verify voltage is applied to the control gates of the memory cells and sensing circuitry is used to sense currents in the NAND strings to determine if the memory cells have been sufficiently erased. If an insufficient number of memory cells have been sufficiently erased, then this process is repeated in one or more subsequent erase loops until the erase verify operation passes. The magnitude of the erase voltage VERA can increase between erase loops by a fixed step size dVERA, as illustrated in FIG. 12.

In memory devices that have a chip under array (CUA) architecture, because the source line is located underneath the vertical stack, a gate induced drain leakage (GIDL) erase operation may be employed to erase the memory cells as opposed to a direct hole injection erase method that may be employed in memory devices that have different architectures. Referring back to FIG. 6D, during a GIDL erase operation, a high voltage is applied in a vertical semiconductor channel 665. Gate-induced leakage current (such as gate-induced drain leakage or a source-side equivalent thereof) generates holes to be injected into the vertical stack of charge storage elements during the erase operation.

Figure 13:
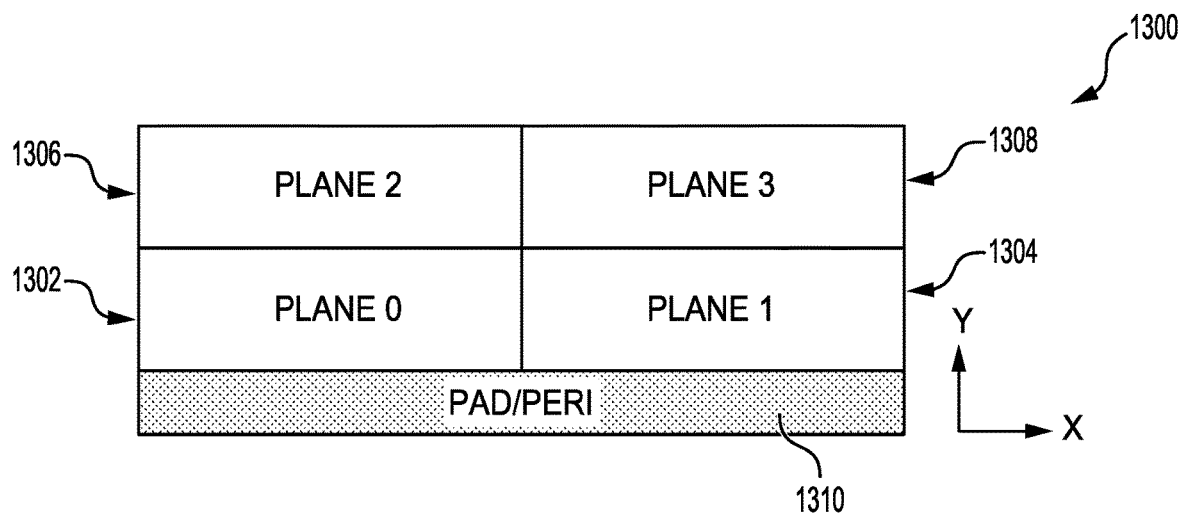
FIG. 13 is a schematic view of an exemplary chip that includes a peripheral circuitry area and four planes.

In an embodiment of the present disclosure, a memory chip or die includes multiple planes, each of which has a plurality of memory blocks. For example, in the example of FIG. 13, the chip 1300 includes four planes (Plane 0 1302, Plane 1 1304, Plane 2 1306, Plane 3 1308) that can simultaneously conduct programming and erasing operations. Each of the planes may have its own plane-specific componentry, and some or all of the planes may also share some componentry. Some of the shared componentry is located in a common PAD/PERI area 1310 which includes componentry that supports the movement of data into and out of the die and to and from the controller. Another component that may be shared among the planes is an erase voltage pump (VERA pump), which supplies the erase voltage VERA to the memory blocks in any of the planes during an erase operation.

Figure 14:
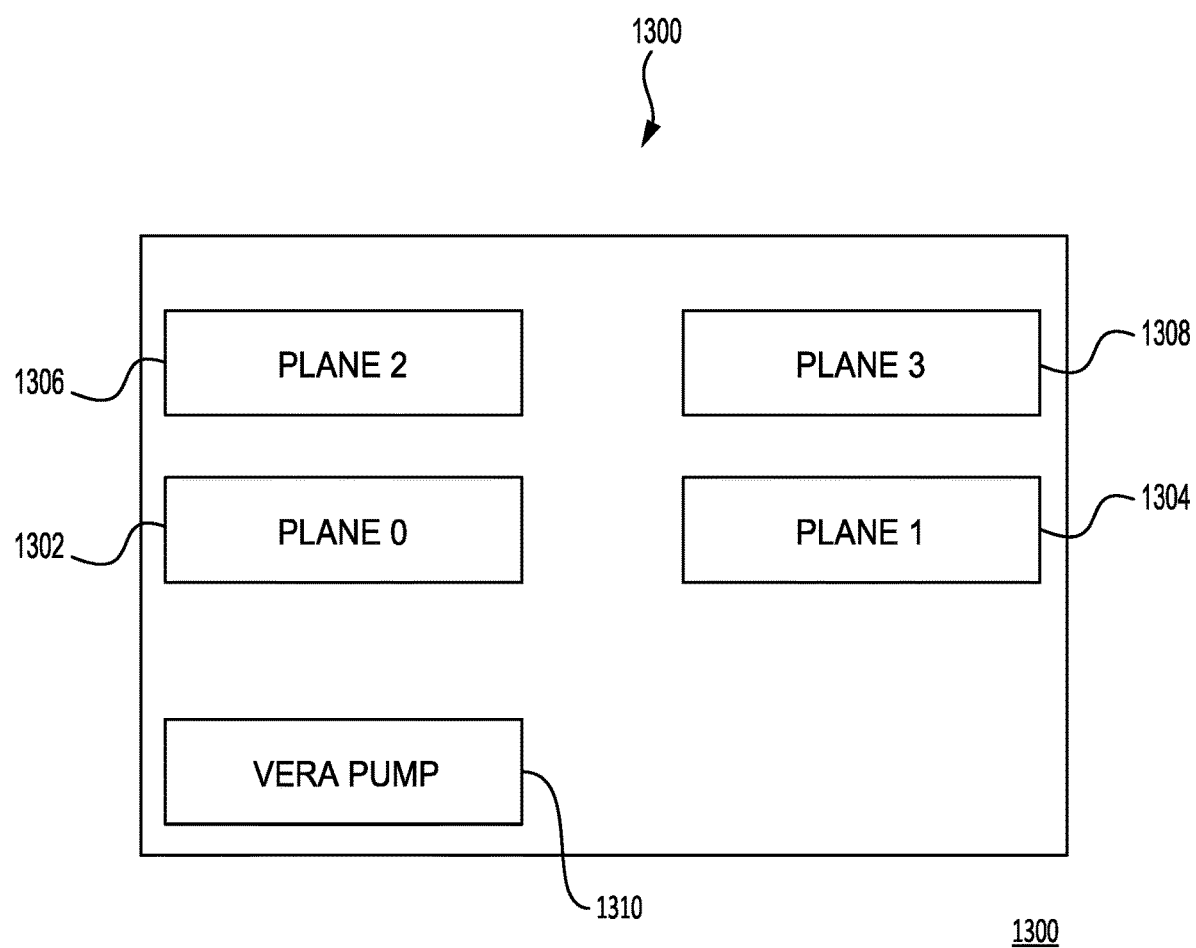
FIG. 14 is a floor-plan layout of the chip of FIG. 13 and illustrating the different distances between a VERA pump and the four planes.

FIG. 14 is a schematic floorplan view that shows a VERA pump 1310 which is physically located closest to Plane 0 1302 and most distant from Plane 3 1308 with Planes 1 and 2 1304, 1306 falling in between. Thus, in this example, Plane 0 1302 is a "close plane" and Plane 1 1308 is a "far plane." This arrangement is only schematic and exemplary, and the actual arrangement of these components in a chip floorplan may differ from what is shown in this illustrative figure but in any case, the planes are physically located at differing distances from the VERA pump. In some embodiments, the chip may also include more than four planes, and some of those planes can be stacked on top of other planes. In some embodiments, some of the planes are stacked vertically on top of other planes.

The physical distance between the VERA pump and a selected plane containing a memory block being erased has been found to have an effect on erase speed. Specifically, with all other parameters being equal, as the distance between the selected plane and the VERA pump increases, the erase voltage VERA that is received at the selected memory block decreases, which results in slower erase speeds. If not corrected, this can compromise erase depth in the memory blocks of certain planes that are the most distant from the VERA pump and lead to non-uniform erase across the planes of the chip. If the erase verify voltage is set at a deep (more negative) voltage level, this may exacerbate the difference in erase depth between the different planes of the chip and cause a reliability mismatch between the planes that can also get worse with program-erase cycling. The reliability mismatch may also get worse with an increasing number of planes in a chip. Thus, there are benefits to improving erase uniformity across the multiple planes in a chip.

Figure 15:
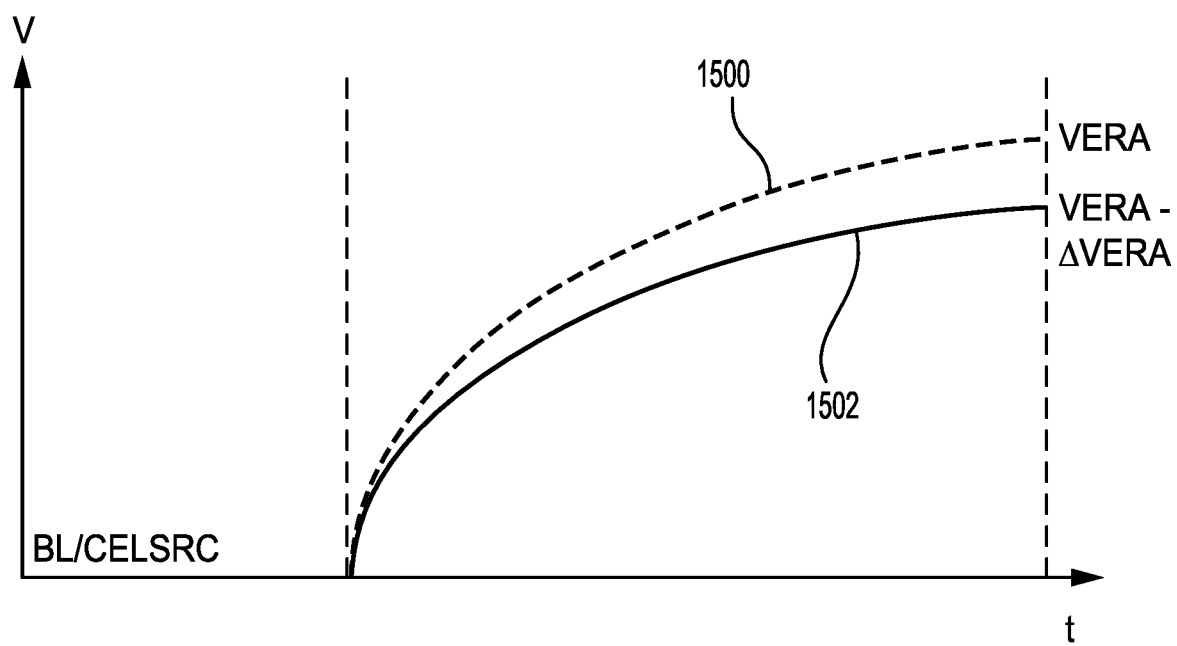
FIG. 15 is a plot of voltage received at the source line and bit lines during erase pulses for a plane that is near a VERA pump and for a plane that is distant from the VERA pump where no bias is applied.

FIG. 15 depicts a plot of the erase voltage received at a selected memory block during an erase pulse in the case where the selected memory block is located in a plane that is close to the VERA pump (line 1500) and in the case where the selected memory block is distant from the VERA pump (line 1502). In both of these instances, the same voltage VERA is supplied by the VERA pump. As illustrated, in this example, the voltage received at the bit lines and/or CELSRC line of a selected memory block in the near plane ramps to approximately the erase voltage VERA, and the voltage received by the selected memory block in the distant plane ramps to a lower voltage that is approximately an offset ΔVERA less than the erase voltage VERA.

The memory device includes circuitry (e.g., the controller, control circuitry, control circuit, and/or a combination thereof) that is configured to perform a modified erase operation as described below in more detail.

According to a first embodiment of the present disclosure, during an erase pulse, the circuitry is configured to increase the target erase voltage VERA that is supplied by the VERA pump to a memory block being erased by a bias voltage ΔVERA. The bias voltage ΔVERA is determined based on the distance between the VERA pump and the plane containing that memory block. The bias voltage ΔVERA may be equal to or different from the aforementioned offset. In other words, the magnitude of the bias voltage ΔVERA is set to a level that is proportional to the distance between the VERA pump and the selected plane. Thus, each plane has a unique bias voltage ΔVERA, e.g., ΔVERA_0 for Plane 0, ΔVERA_1 for Plane 1, ΔVERA_2 for Plane 2, and ΔVERA_3 for Plane 3. In some cases, ΔVERA can be set to zero Volts (0 V) for the plane that is closest to the VERA pump, e.g., Plane 0 in the layout of FIG. 14.

Thus, when erasing the memory cells of a memory block that is in a selected plane which is near the VERA pump (for example, Plane 0 1302 in the layout of FIG. 14), the VERA pump supplies the erase voltage VERA with either no bias voltage or a very small bias voltage ΔVERA. This serves as the baseline voltage for the chip. When erasing a memory block that is in a plane which is distant from the VERA pump (for example, Plane 3 1308 in the layout of FIG. 14), the erase voltage that is supplied by the voltage pump is increased by a relatively large bias voltage ΔVERA_3 (VERA+ΔVERA_3). Accordingly, the voltage that is received by the memory block in the distant plane generally matches the baseline voltage VERA that is received by the close plane.

With respect to the floor plan of FIG. 14, the bias voltage ΔVERA_3 for Plane 3 1308 is greater than the bias voltages ΔVERA_1 and ΔVERA_2 of Plane 1 1304 and Plane 2 1306 respectively so that the voltages that are received by all of the planes generally match the baseline voltage VERA that is received at Plane 0 1302. In some embodiments, the bias voltage ΔVERA may even vary within a plane with the memory blocks on an opposite side of the plane from the VERA pump receiving a greater bias voltage ΔVERA than the blocks on a side of the plane that is closest to the VERA pump. In some embodiments, the bias voltages ΔVERA could be in the range of 0 mV to 400 mV. For example, in one example embodiment, ΔVERA_0=0 mV, ΔVERA_1=300 mV, ΔVERA_2=100 mV, and ΔVERA_3=400 mV. This is just one example and the actual voltages may vary.

Figure 16A:
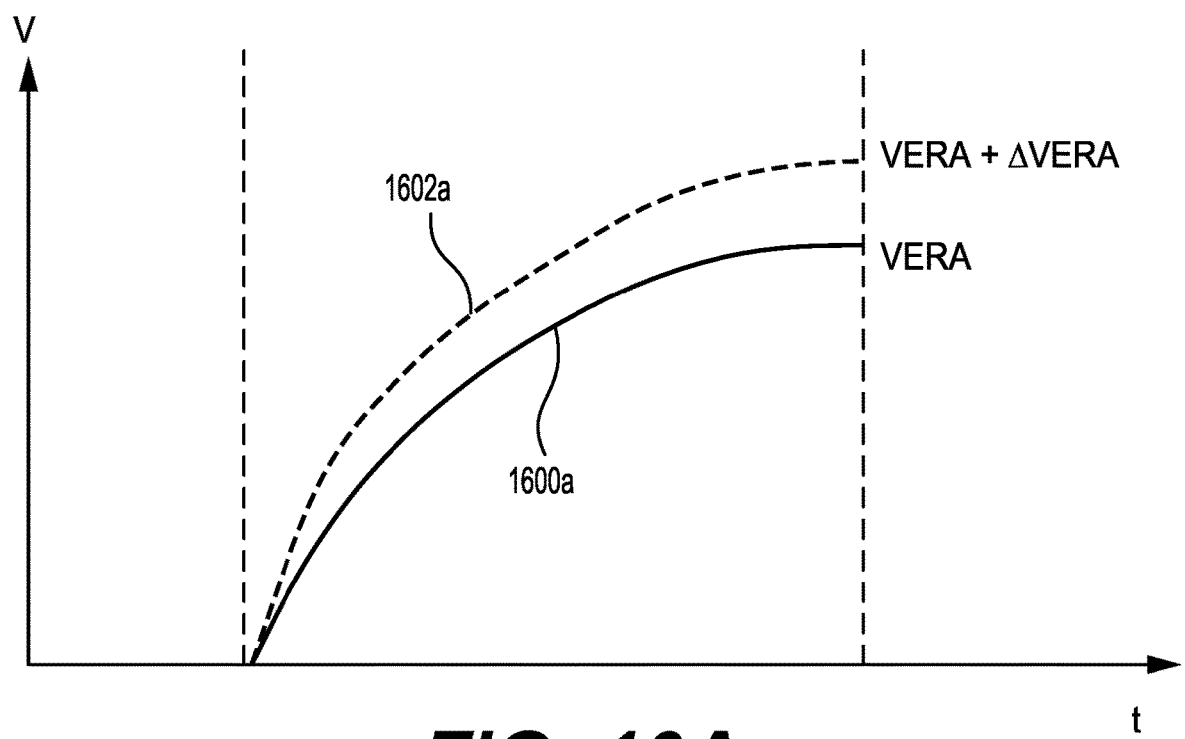
FIG. 16A is a plot of voltage supplied by the VERA pump to both a plane that is near the VERA pump and to a plane that is distant from the VERA pump.
Figure 16B:
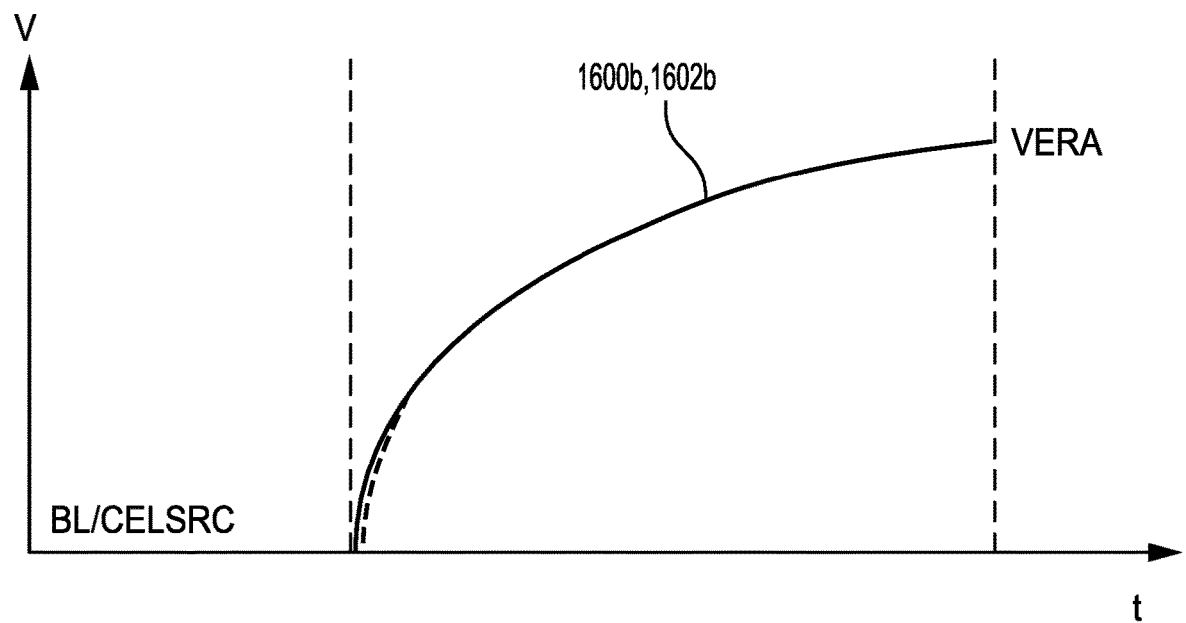
FIG. 16B is a plot of the voltages received by the near and distant planes as a result of the voltages supplied by the VERA pump.

The bias voltage ΔVERA is applied during the erase pulses of all erase loops of the erase operation. FIG. 16A illustrates the voltage supplied by the VERA pump to a near plane (line 1600a) and to a distant plane (line 1602a) during an example erase loop. As illustrated, the target voltage to the distant plane has been increased by the bias voltage ΔVERA. Turning now to FIG. 16B, the voltages (lines 1600b, 1602b) that are received at the bit lines and/or the CELSRC line of selected memory blocks in the near and far planes are similar at approximately the target erase voltage VERA, i.e., the difference between the planes is very small. Thus, these erase techniques reduce the erase inconsistency between the different planes.

According to some embodiments of the present disclosure, rather than being configured to increase the target erase voltage for the distant planes relative to close planes, the circuitry is configured to set the erase voltage that is received by a memory block in a distant plane as the baseline voltage and to adjust the voltages that are supplied to memory blocks in closer planes. Specifically, in these embodiments, the erase voltage VERA supplied by the VERA pump is decreased by a bias voltage ΔVERA (VERA−ΔVERA) to generally match the baseline voltage.

For example, when erasing the memory cells of a memory block that is in a selected plane which is very distant from the VERA pump, the VERA pump supplies the erase voltage VERA with either no bias voltage or a very small bias voltage ΔVERA. On the other hand, when erasing a memory block that is in a plane which is near the VERA pump, the target erase voltage that is supplied by the VERA pump is decreased by a relatively large bias ΔVERA, i.e., VERA−ΔVERA. Each plane may be associated its own respective bias voltage ΔVERA. For each plane, the magnitude of the respective bias voltage ΔVERA may be set proportionately a physical distance between the VERA pump and the selected plane with ΔVERA decreasing with distance, i.e., each plane may have a unique bias voltage ΔVERA. For example, with respect to the floor plan of FIG. 14, the bias voltage ΔVERA_0 associated with near plane, such as Plane 0 1302 is greater than the bias voltages ΔVERA_1, ΔVERA_2 associated with Plane 1 1304 and Plane 2 1306 respectively.

Figure 17A:
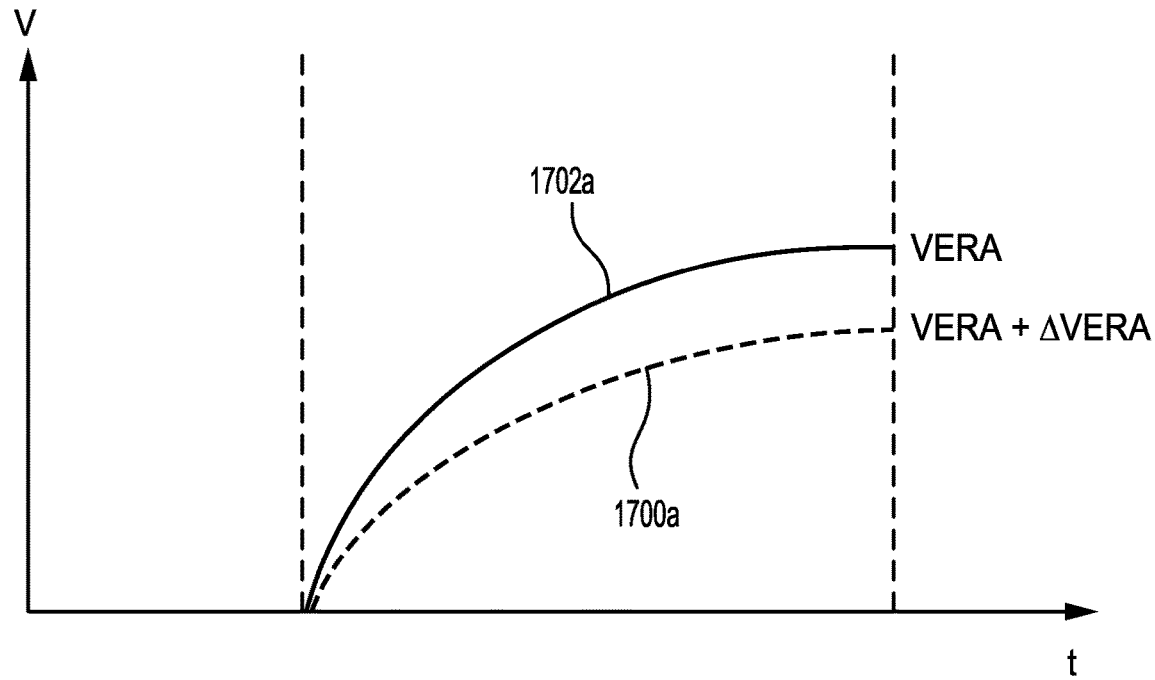
FIG. 17A is a plot of voltage supplied by the VERA pump to both a plane that is near the VERA pump and to a plane that is distant from the VERA pump.
Figure 17B:
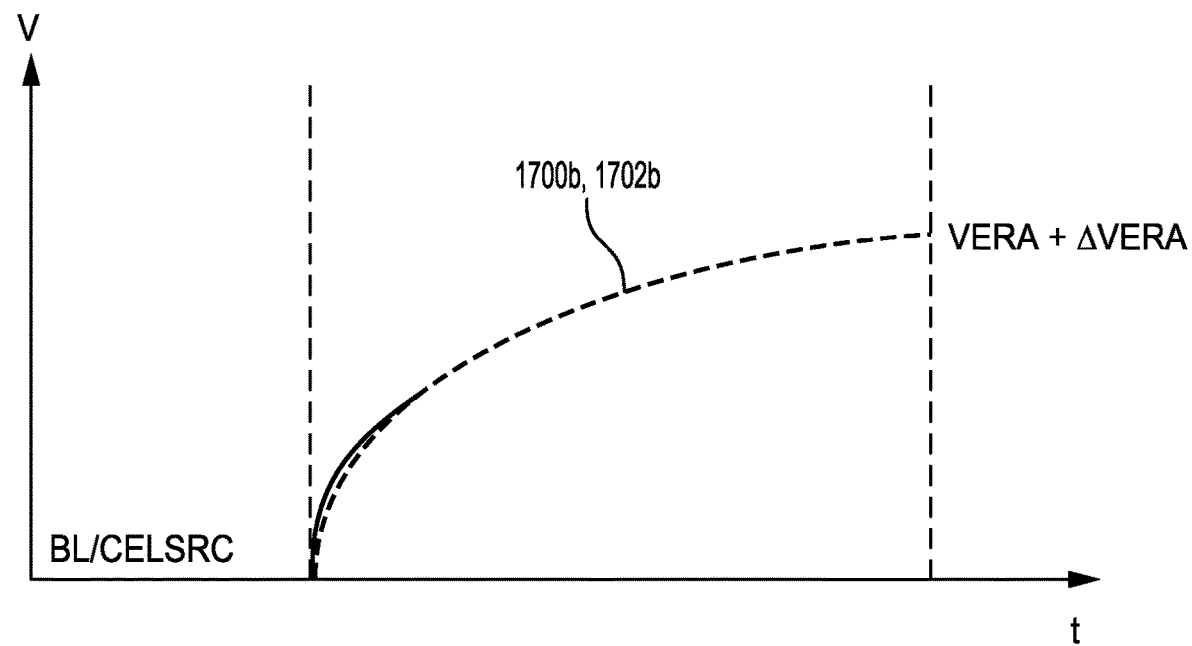
FIG. 17B is a plot of the voltages received by the near and distant planes as a result of the voltages supplied by the VERA pump.

The bias voltage ΔVERA is applied to the voltage that is supplied by the VERA pump during the erase pulses of all erase loops of the erase operation. As illustrated in FIG. 17A, in this example, the target erase voltage that is supplied by the VERA pump to the near plane (line 1700a) is less than the target erase voltage that is supplied by the VERA pump to the distant plane (line 1702a). Turning now to FIG. 17B, the voltages (lines 1700b, 1702b) that are received at the bit lines and/or the CELSRC line of selected memory blocks in the near and far planes are similar at approximately the target erase voltage VERA−ΔVERA, i.e., the difference between the planes is very small. Thus, these erase techniques reduce the erase inconsistency between the different planes.

Figure 18A:
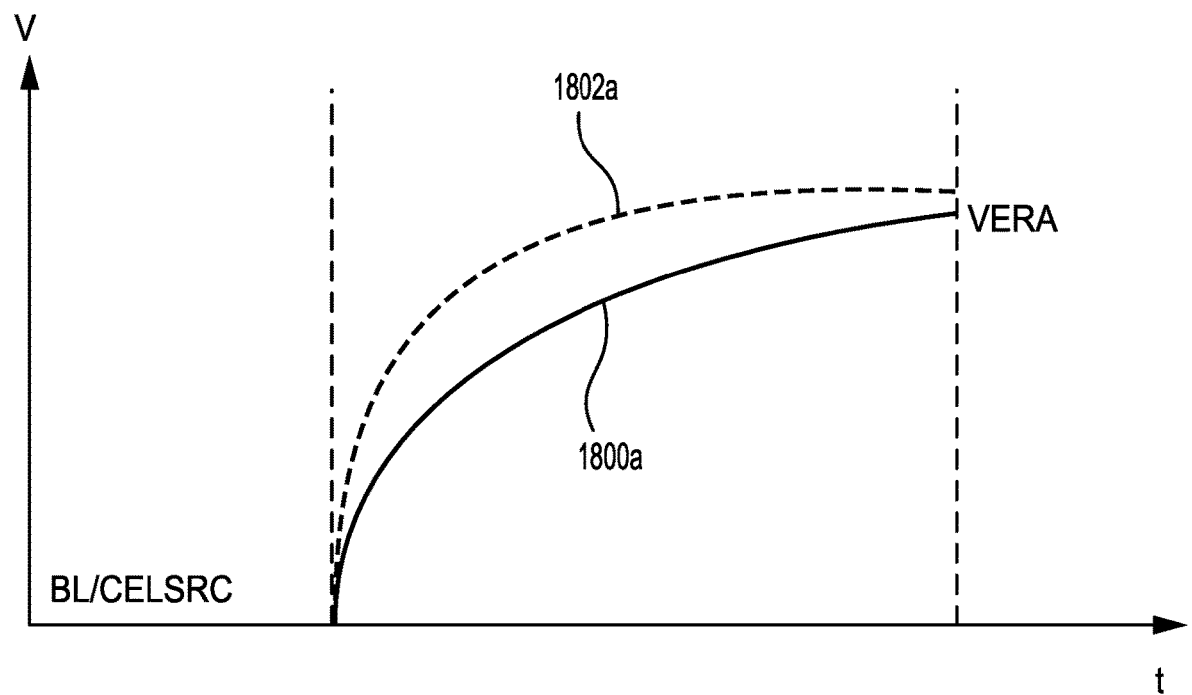
FIG. 18A is a plot of voltage supplied by the VERA pump to both a plane that is near the VERA pump and to a plane that is distant from the VERA pump.
Figure 18B:
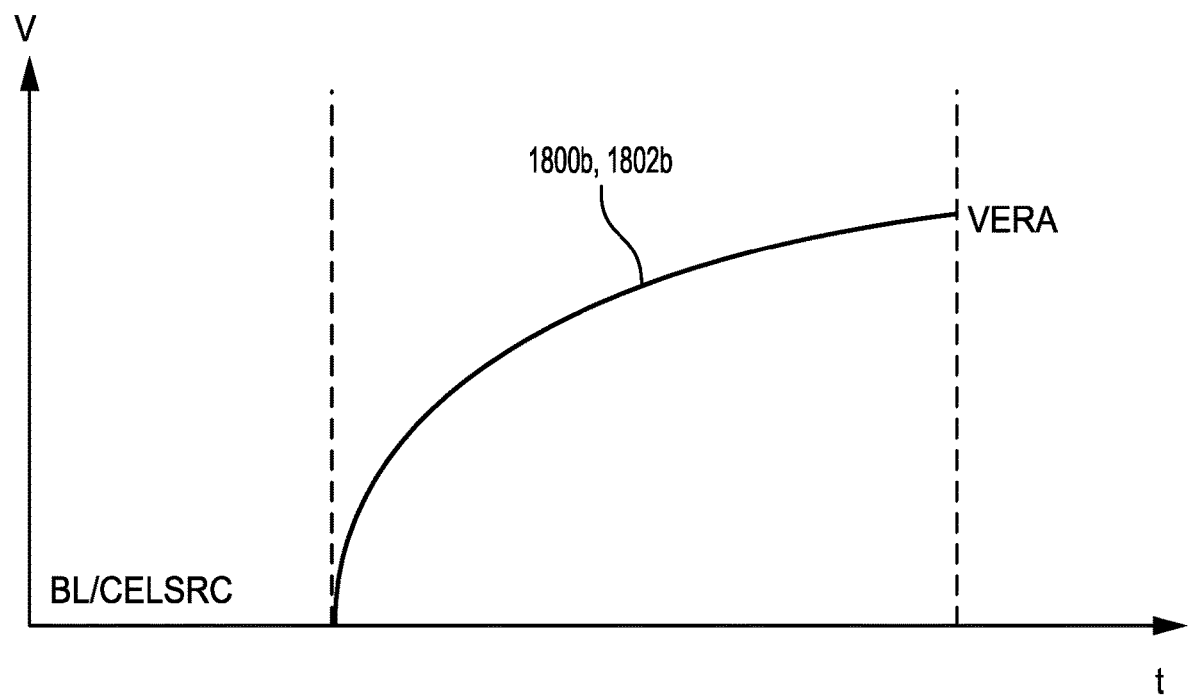
FIG. 18B is a plot of the voltages received by the near and distant planes as a result of the voltages supplied by the VERA pump.
Figure 21:
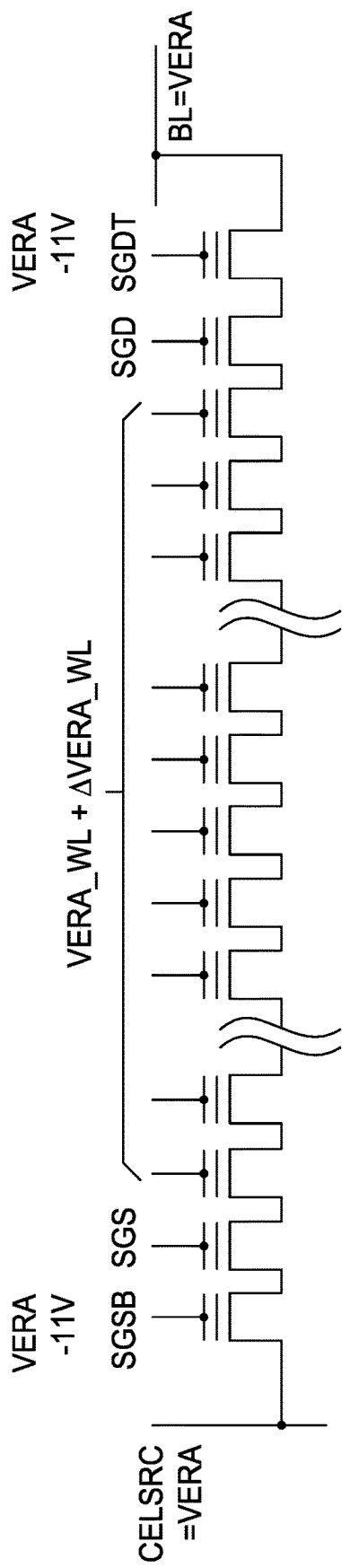
FIG. 21 is a schematic view of a NAND string in a memory block where a bias voltage is applied to the word lines of the memory block being erased.

In some embodiments, rather than varying the target erase voltage, the circuitry can be configured to adjust, or bias, the ramp rate of the erase voltage supplied by the VERA pump to achieve the similar results to those discussed above. For example, in the embodiment of FIG. 18A, the erase voltage supplied by the VERA pump to the plane that is near the VERA pump (line 1800a) ramps to the target erase voltage VERA at a first rate, and the erase voltage supplied by the VERA pump to the plane that is distant from the VERA pump (line 1802a) targets/attempts to ramp to the target erase voltage VERA at a greater (more aggressive) second rate. By establishing different targeted ramp rates for different planes based on the distance from the VERA pump to the respective planes, a more uniform erase can be achieved. For example, as illustrated in FIG. 18B, the voltages that are received at the near plane (line 1800b) and the distant plane (line 1802b) are nearly identical during the erase pulse, including during the ramp.

Each plane may have a unique ramp rate that is proportional to the distance between the respective plane and the VERA pump to achieve an improved erase consistency across the various planes in the chip. Also, the ramp rate could vary within each plane with the memory blocks within a plane that are more distant from the VERA pump having higher ramp rates than the memory blocks that are within the same plane but are closer to the VERA pump.

In some embodiments, rather than increasing the ramp rate for the planes based on distances between the VERA pump and the respective planes, the ramp rates can be decreased based on the proximity of the respective planes (or the blocks within each plane) to the VERA pump. In other words, the first ramp rate for the plane that is near the VERA pump can be lowered, or biased downwardly (less aggressive), as compared to the second ramp rate for the plane that is distant from the VERA pump.

Referring now to FIGS. 19 and 20, according to another embodiment of the present disclosure, the control circuitry is configured to adjust the voltages that are applied to specific the select gate transistors SGDT, SGSB on the opposite sides of the string during the erase pulse in order to modulate the GIDL erase and compensate for the erase depth difference. As discussed in further detail below, during an erase pulse, which specific select gate transistors receive the bias voltage depends on whether the erase is a drain-side erase, a source-side erase, or a double-sided erase. These figures depict the voltages applied to a memory block during a double-sided erase for a plane that is close to the VERA pump (FIG. 19) and for a plane that is distant from the VERA pump (FIG. 20). The voltages illustrated in FIG. 19 could be, for example, Plane 0 1302 with respect to the example floor plan of FIG. 14. As illustrated, the voltages applied to the top drain-side select gate (SGDT) transistor and the bottom source-side select gate (SGSB) transistor are set at the erase voltage VERA minus a predetermined amount, e.g., eleven Volts (11 V).

FIG. 20 illustrates the voltages applied to a memory block in a plane that is distant from the VERA pump, e.g., Plane 3 1308 of FIG. 14. As illustrated, in order to boost the erase operation, during the erase pulse, the voltages applied to the SGDT and SGSB are further reduced (as compared to FIG. 19) by a bias voltage ΔVERA, i.e., VERA−11 V−ΔVERA. As with the embodiments discussed above, the magnitudes of the bias voltage ΔVERA for the different planes may be set at levels that are proportional to the distance between the VERA pump and the plane containing the selected memory block being erased, i.e., each plane may be associated with a unique bias voltage ΔVERA. In some embodiments, each memory block within a plane may be associated with a unique bias voltage ΔVERA based on its specific distance from the VERA pump.

By reducing the voltages applied to the transistors SGDT and SGSB by the distant-dependent bias voltage ΔVERA, erase uniformity is improved across the different planes in the chip.

In some embodiments, rather than reducing the voltages applied to the transistors SGDT and SGSB based on the distance a plane is from the VERA pump, these voltages can be increased based on the proximity of a given plane to the VERA pump. For example, in a distant plane, the voltages applied to SGDT and SGSB can be set at VERA−11 V, and in a close plane, the voltages applied to SGDT and SGSB can be set at VERA−11 V+ΔVERA. As with the other embodiments described above, each plane, or even each memory block within a plane, may be associated with a unique bias voltage ΔVERA to improve erase uniformity across the chip.

In embodiments where the erase operation is a drain-side erase, then the bias voltage ΔVERA is only applied to the SGDT transistor, and in embodiments where the erase operation is a source-side erase, then the bias voltage ΔVERA is only applied to the SGSB transistor.

According to another example embodiment, the aggressiveness of the erase operation can be increased or decreased by, through the control circuitry, applying an additional bias voltage ΔVERA_WL to the control gates of the word lines being erased during the erase pulse.

Turning back to FIG. 19, during an erase pulse, a word line erase voltage VERA_WL is applied to all of the word lines being erased, which could be all of the data word lines in the memory block or could be the word lines of a sub-block. By biasing the word line erase voltage VERA_WL either up or down, the erase speed can either be reduced or increased respectively.

In some embodiments, if the baseline erase speed is set at the erase speed of a plane that is distant from the VERA pump, then erase can be slowed for a nearer plane by increasing the word line erase voltage VERA_WL by a positive bias voltage ΔVERA_WL (VERA_WL+ΔVERA_WL) that is unique to the plane containing the memory block being erased. If the baseline erase speed is set at the erase speed of a plane that is near the VERA pump, then the erase can be sped up for a more distant plane by reducing the word line erase voltage VERA by a bias voltage ΔVERA_WL (VERA_WL−ΔVERA_WL) that is unique to the plane containing the memory block being erased.

As with the above-discussed embodiments, the bias voltage ΔVERA_WL can vary from memory block to memory block within a plane based on the distance of each specific memory block from the VERA pump.

Figure 22:
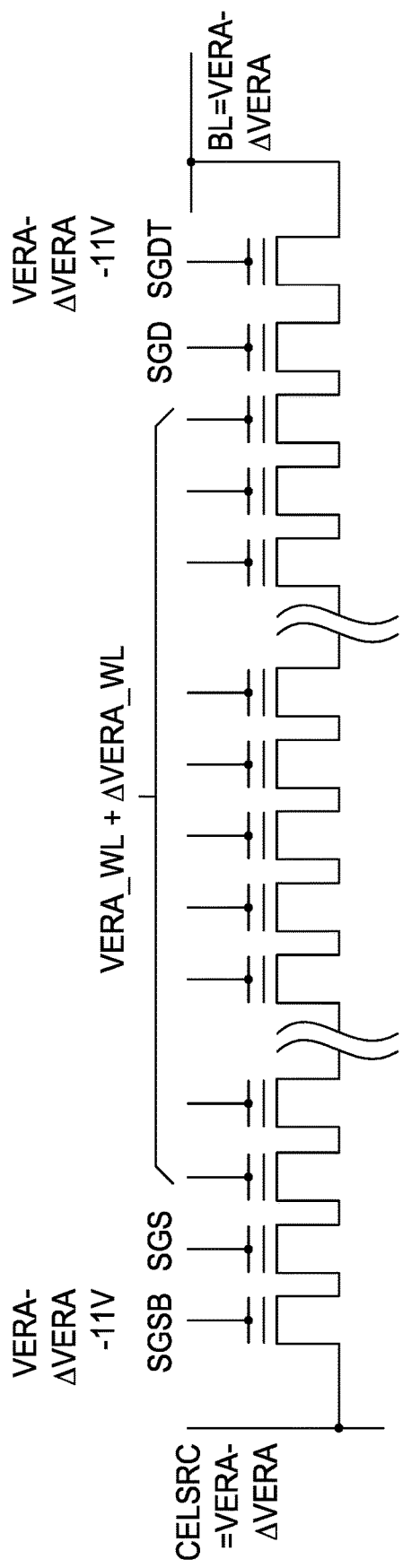
FIG. 22 is a schematic view of a NAND string in a memory block during an erase pulse and wherein a bias voltage is applied to the word lines of the memory block being erased and wherein bias voltages are applied to the SGSB and SGDT transistors.

Turning now to FIG. 22, in some embodiments, two or more of the embodiments described above can be combined together. For example, during an erase operation, to increase erase speed in a distant plane to meet the erase speed in a nearer plane, an additional negative bias voltage ΔVERA can be applied to the transistors SGDT, SGSB and an additional negative word line bias ΔVERA_WL can be applied to the word lines. The specific magnitudes of the bias voltages ΔVERA, ΔVERA_WL can be determined experimentally and balanced to match the erase speed of a given plane to the baseline erase speed. Each plane or each memory block within each plane can be associated with unique bias voltages ΔVERA, ΔVERA_WL.

In all of the above embodiments, by reducing the variation in erase speeds across the different planes of the chip, the erase depths can be set more uniformly and reliability is improved.

Figure 11:
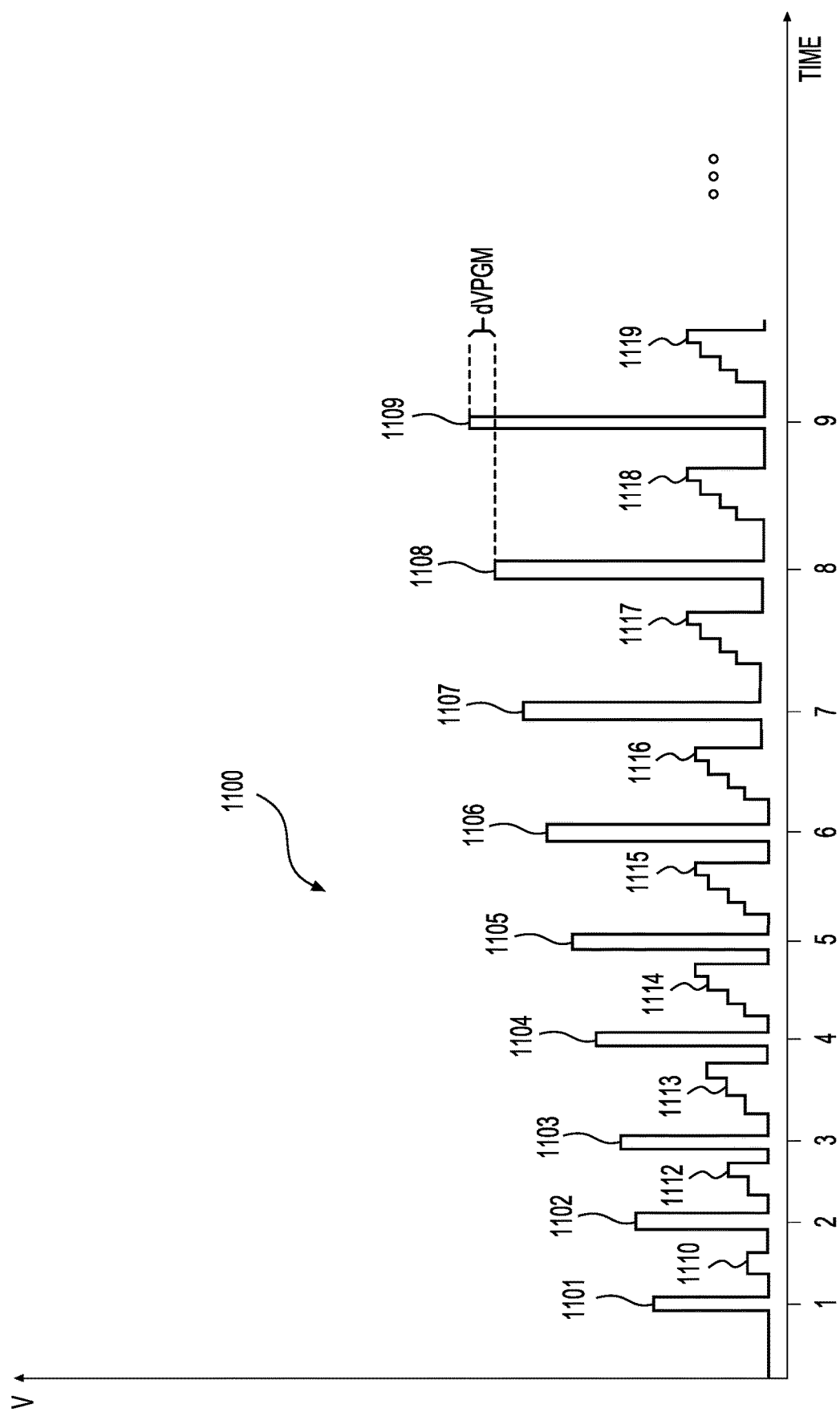
FIG. 11 is a voltage waveform chart depicting the voltages applied to a word line that contains memory cells being programmed during a program and verify operation.

Another aspect of the present disclosure is related to programming techniques to make programming speeds more uniform across the multiple planes in a chip. Programming to multiple bits per memory cell (for example, MLC, TLC, or QLC) typically includes a plurality of program loops. FIG. 11 depicts a waveform 1100 of the voltages applied to a selected word line during an example memory cell programming operation for programming the memory cells of the selected word line to a greater number of bits per memory cell (e.g., TLC or QLC). As depicted, each program loop includes a programming pulse VPGM and one or more verify pulses, depending on which data states are being programmed in a particular program loop. A square waveform is depicted for each pulse for simplicity; however, other shapes are possible, such as a multilevel shape or a ramped shape.

Incremental Step Pulse Programming (ISPP) is used in this example pulse train, which means that the VPGM pulse amplitude steps up, or increases, in each successive program loop. In other words, the pulse train includes VPGM pulses that increase stepwise in amplitude with each successive program loop by a fixed step size (dVPGM). A new pulse train starts with an initial VPGM pulse level VPGMU and ends at a final VPGM pulse level, which does not exceed a maximum allowed level. The example pulse train 1100 includes a series of VPGM pulses 1101-1109 that are applied to a selected word line that includes a set of non-volatile memory cells. One or more verify voltage pulses 1110-1119 are provided after each VPGM pulse as an example, based on the target data states which are being verified in the program loop. The verify voltages correspond with voltages Vv1-Vv7 shown in FIG. 9 or Vv1-Vv15 shown in FIG. 10. Concurrent with the application of the verify voltages, a sensing operation can determine whether a particular memory cell in the selected word line has a threshold voltage Vt above the verify voltage associated with its intended data state by sensing a current through the memory cell. If the current is relatively high, this indicates that the memory cell is in a conductive state, such that its threshold voltage Vt is less than the verify voltage. If the current is relatively low, this indicates that the memory cell is in a non-conductive state, such that its threshold voltage Vt is above the verify voltage. If the memory cell passes verify, programming of that memory cell is completed and further programming of that memory cell is inhibited for all remaining program loops by applying an inhibit voltage to a bit line coupled with the memory cell concurrent with the VPGM pulse. Programming proceeds until all memory cells pass verify for their intended data states, in which case, programming passes, or until a predetermined maximum number of program loops is exceeded, in which case, programming fails. In some embodiments, the memory cells of a word line can be divided into a series of string groups, or simply strings, that can be programmed independently of one another, and programming can commence from one string to another across the word line before proceeding to the next word line in the memory block.

Figure 23:
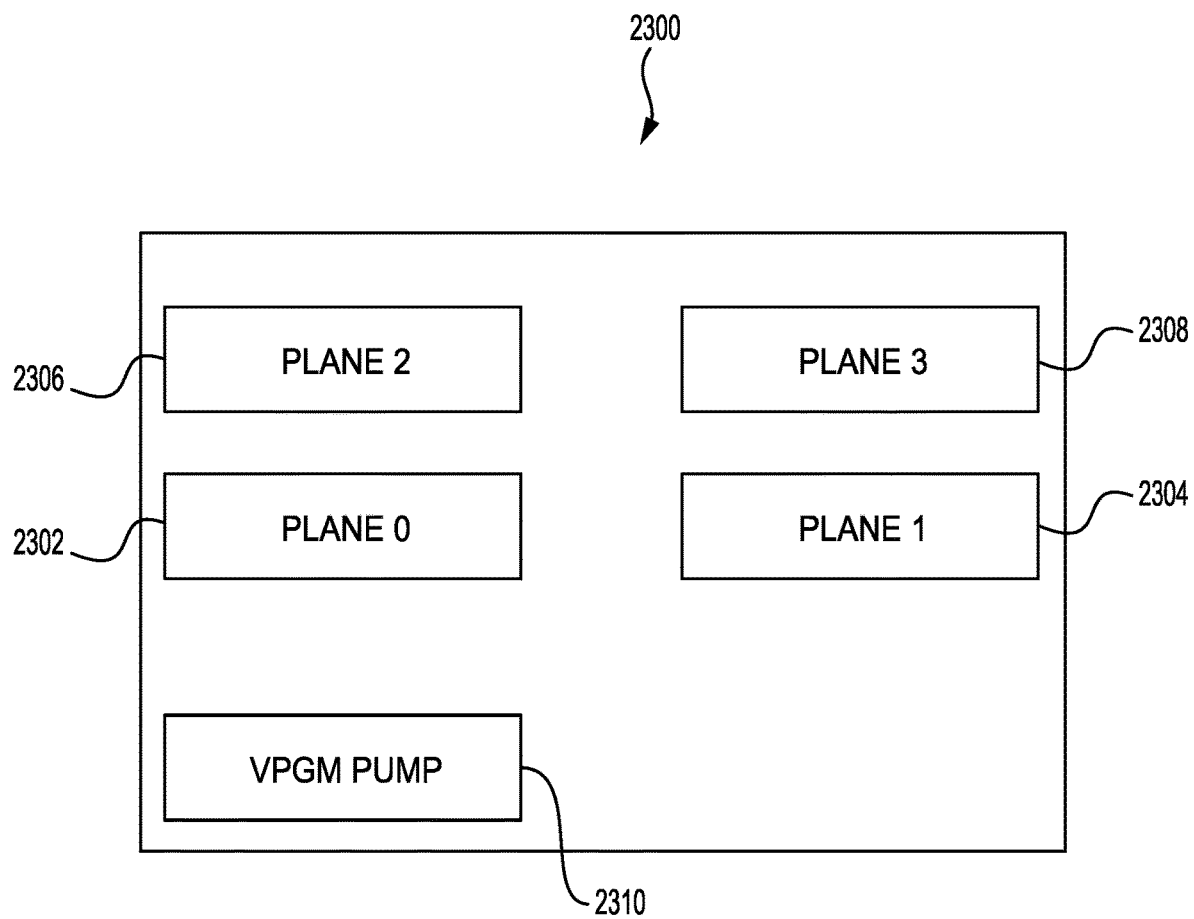
FIG. 23 is a floor-plan layout of an example chip and illustrating the different distances between a VPGM pump and the four planes.

Programming speed can made more uniform across a memory block by biasing any one or more of the programming pulse voltage VPGM, a bit line bias voltage VBL, and a pass voltage VPASS based on the distance between a VPGM pump and a plane containing a selected word line WLn being programmed. Specifically, like the erase voltage VERA discussed above, it has been found that the programming pulse voltage VPGM received at the control gate of a selected word line decreases with increasing distance between the plane containing the selected word line and the VPGM pump. In the example layout of FIG. 23, the chip 2300 includes four planes: Plane 0 2302, Plane 2, 2304, Plane 3 2306, and Plane 4 2308 of varying distances from the VPGM pump 2310. Plane 0 2302 is a near plane that is nearest to the VPGM pump 2310, and Plane 3 2308 is a far plane that is most distant from the VPGM pump 2310. Thus, with all other things being equal, Plane 0 2302 will receive the highest VPGM voltage and Plane 3 2308 will receive the lowest VPGM voltage. The programming techniques of the present disclosure compensate for this so that memory cells in all planes are programmed at approximately the same speed.

Figure 24:
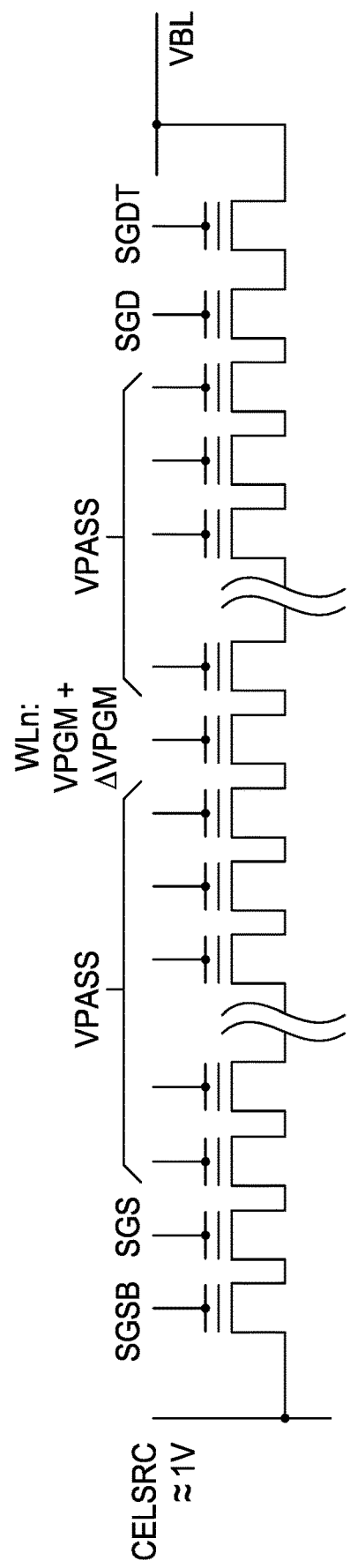
FIG. 24 is a schematic view of a NAND string in a memory block during a programming pulse and illustrating a bias voltage that is applied to a programming voltage VPGM.

In contrast to erase, as discussed above, programming occurs one word line at a time from one end of a memory block or sub-block to an opposite end. Typically, programming the memory cells of a selected word line to retain multiple bits per memory cell (for example, MLC, TLC, or QLC) starts with the memory cells being in the erased data state and includes a plurality of program loops. With reference to FIG. 24, during the VPGM pulse, a programming voltage is applied to the selected word line WLn that contains the memory cells being programmed, a pass voltage VPASS is applied to the unselected word lines, and bit line voltages VBL are applied to the bit lines coupled to the memory cells of the memory block. The pass voltage VPASS turns on the memory cells of the unselected word lines on either side of the selected word line WLn. During a program pulse, if a memory cell is determined during a verify operation to have a threshold voltage Vt that is less than the verify voltage of its intended data state, then the bit line voltage VBL of the bit line coupled to that memory cell is set at a very low level, e.g., 0.7 V. On the other hand, if the memory cell is determined to have a threshold voltage Vt that is greater than the verify voltage of its intended data state, then the bit line voltage is set at an inhibit voltage to inhibit programming of that memory cell.

In the embodiment of FIG. 24, the VPGM voltage is adjusted by a bias voltage $\Delta$VPGM to either increase or decrease programming speed depending on the distance between the plane containing the selected word line and the VPGM pump so that the programming speed is uniform across the different planes of the chip. In some embodiments, the baseline programming speed is set at the level of the closest plane to the VPGM pump (e.g., Plane 0 2302 in the layout of FIG. 23). In these embodiments, for the planes that are more distant from the VPGM pump, the target programming voltage that is supplied by the VPGM pump is increased by the bias voltage $\Delta$VPGM. In some embodiments, the baseline programming speed is set at the level of the furthest plane from the VPGM pump (e.g., Plane 3 2308 in the layout of FIG. 23). In these embodiments, for the planes that are closer to the VPGM pump, the target programming voltage that is supplied by the VPGM pump is decreased by the bias voltage $\Delta$VPGM. Each plane may have a unique bias voltage $\Delta$VPGM so that the programming speed is generally uniform across all planes in the chip.

Figure 25A:
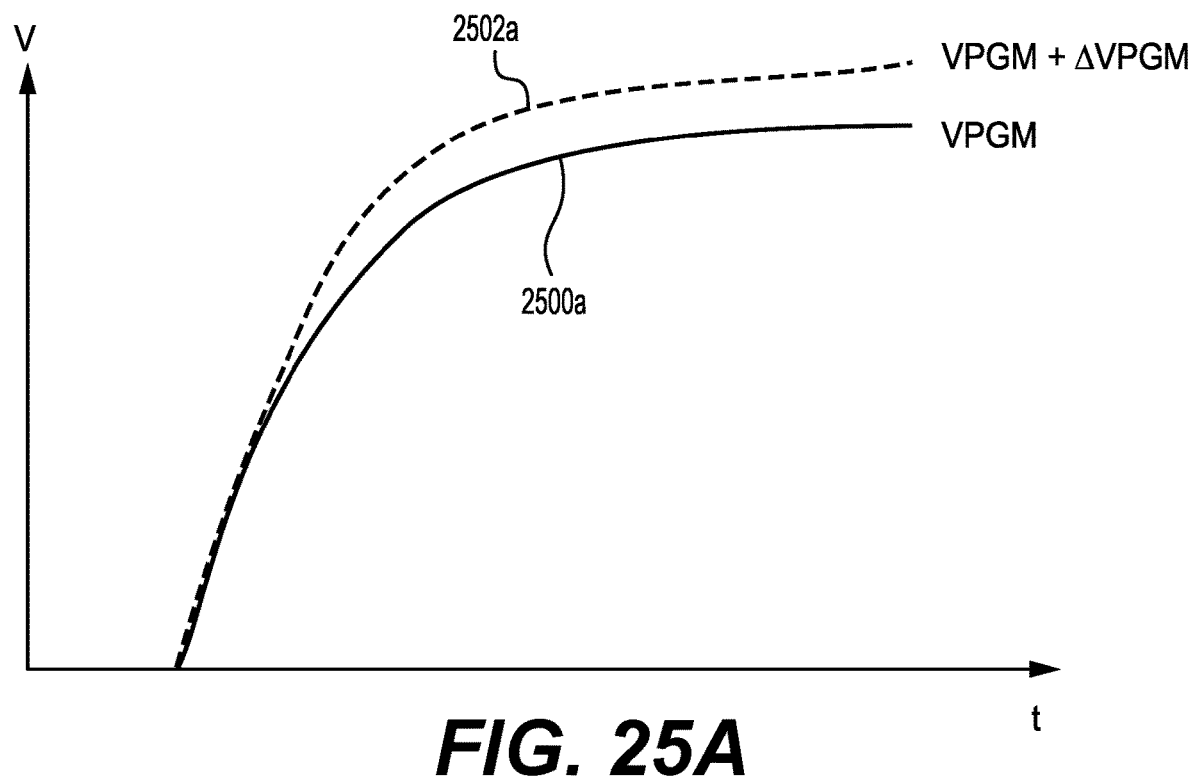
FIG. 25A is a plot of voltage versus time of the voltages supplied by the VPGM pump to word lines in planes that are both near and distant from the VPGM pump.
Figure 25B:
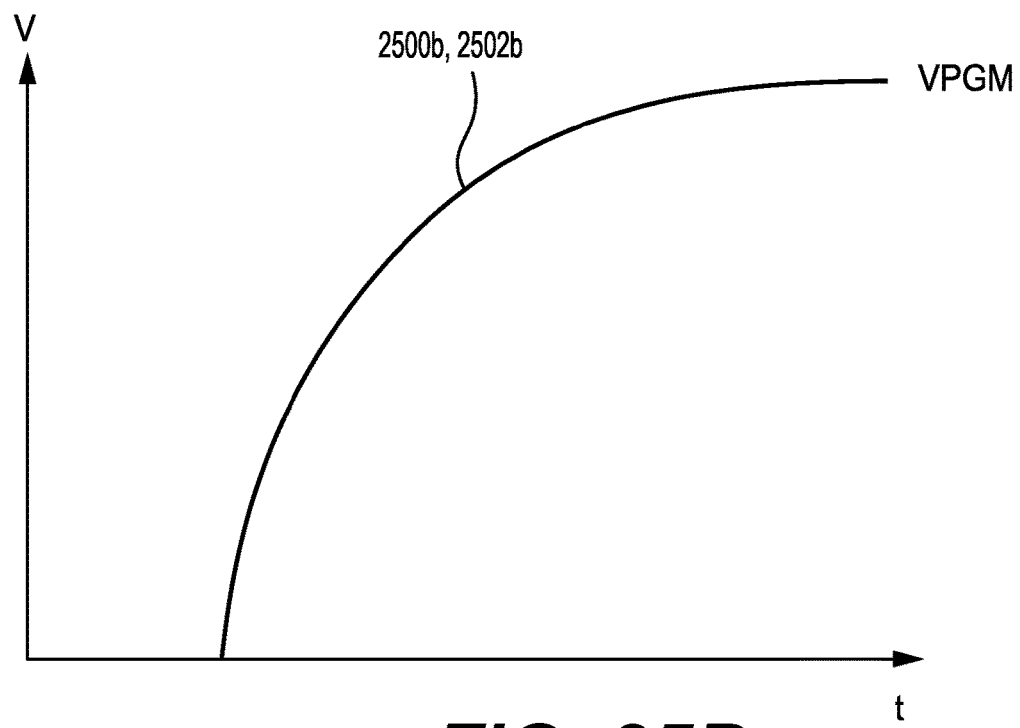
FIG. 25B is a plot of voltage versus time of the voltages received by the near and distant planes.

FIG. 25A illustrates the programming voltage supplied by the VPGM pump during example programming pulses for both a word line in a plane that is near the VPGM pump (line 2500a) and distant from the VPGM pump (line 2502a). As illustrated, the voltage supplied by the VPGM pump to the distant plane has been increased by the bias voltage $\Delta$VPGM. Turning now to FIG. 25B, the voltages that are received by the word lines in both the near and distant planes are generally equal (lines 2500a, 2500b). Thus, by applying the additional bias voltage $\Delta$VPGM based on the distance between the plane containing the word line being programmed and the VPGM pump, the variation in programming across the different planes of the chip has been reduced.

Figure 26:
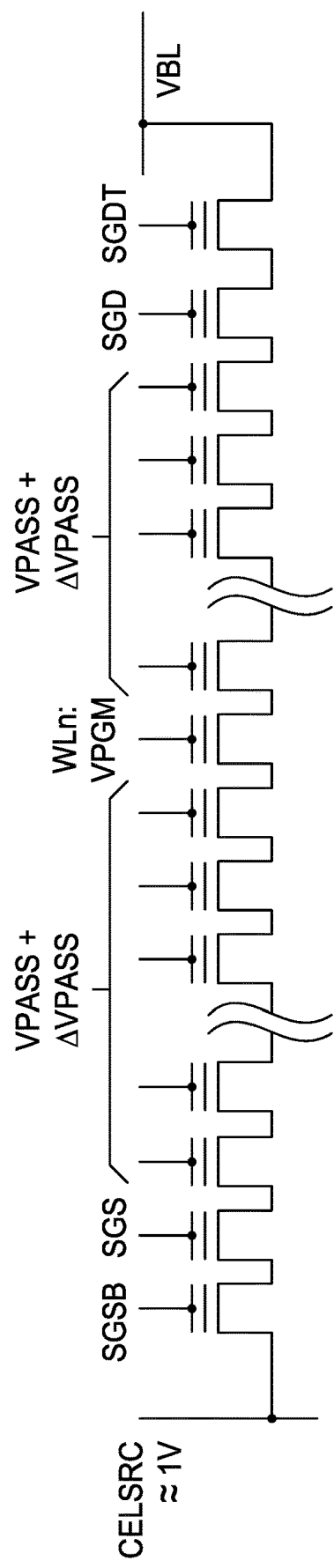
FIG. 26 is a schematic view of a NAND string in a memory block during a programming pulse and illustrating a bias voltage that is applied to the unselected word lines.

Turning now to FIG. 26, in another embodiment, a pass voltage VPASS is adjusted by a bias voltage $\Delta$VPASS to make programming more uniform across the multiple planes of a chip. As illustrated, during the programming pulse, the pass voltage VPASS is applied to the unselected word lines on either side of the selected word line WLn in order to "turn on" the other memory cells in the NAND string. Increasing the pass voltage VPASS that is applied to these unselected word lines will effectively make the other memory cells in a NAND string more conductive and speed up programming of a memory cell being programmed in case VPASS is the bottleneck for programming. Conversely, decreasing the pass voltage VPASS will make the other memory cells less conductive and slow down programming of the memory cell being programmed, in case VPASS is the bottleneck for programming.

In some embodiments, a baseline programming speed is set as the programming speed of a word line in a near plane, which is proximate to the VPGM pump. The bias voltages $\Delta$VPASS of the other planes are set at levels to increasing levels with increasing distance between the planes and the VPGM pump compensate for the reduced programming voltages that are received at these more distant planes and speed up programming to match the baseline programming speed. In some other embodiments, the baseline programming speed is set as the programming speed of a distant plane, which is far from the VPGM pump. The bias voltages $\Delta$VPASS of the other planes are set at negative levels with decreasing distance between the planes and the VPGM pump to counteract the increased programming voltages that are received at these closer planes and slow down programming to match the baseline programming speed.

Figure 27:
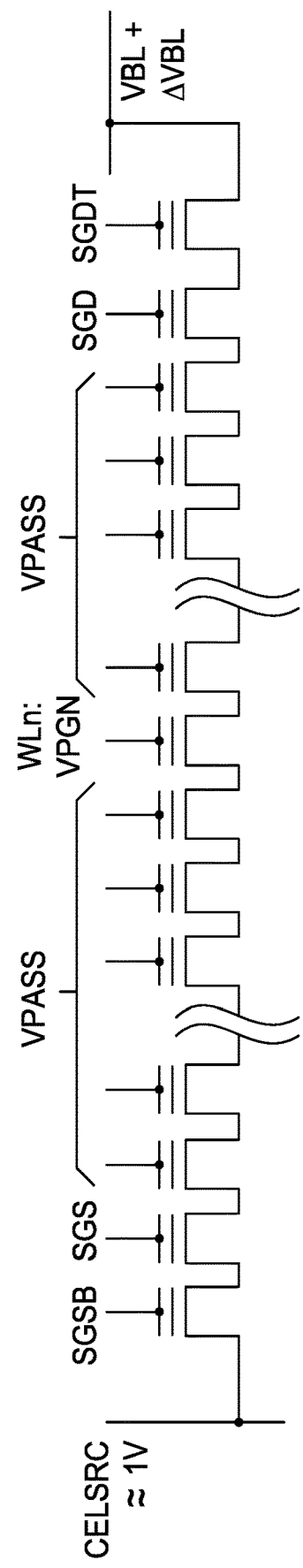
FIG. 27 is a schematic view of a NAND string in a memory block during a programming pulse and illustrating a bias voltage that is applied to a bit line voltage.

Turning now to FIG. 27, in another embodiment, a bit line voltage VBL applied to the bit lines that are coupled to the memory cells being programmed in a program loop is adjusted by a bias voltage $\Delta$VBL to make programming more uniform across the multiple planes of a chip. As illustrated, during the programming pulse, the bit line voltage VBL is applied to the bit lines that are coupled to all of the memory cells that are being programmed (all non-inhibited memory cells in the selected word line). In some embodiments, the bit line voltage VBL is set at approximately 0.7 V. Increasing the bit line voltage VBL will effectively slow programming by reducing the voltage difference between the selected word line WLn and a memory hole containing the memory cell being programmed. Conversely, decreasing the bit line voltage VBL will effectively speed up programming by increasing this voltage difference.

In some embodiments, a baseline programming speed is set as the programming speed of a word line in a near plane, which is proximate to the VPGM pump. The bias voltages $\Delta$VBL of the other planes are set at levels to compensate for the reduced programming voltages that are received at these more distant planes and speed up programming to match the baseline programming speed. More specifically, the bias voltages $\Delta$VBL are set at decreasing levels with increasing distance between the planes and the VPGM pump. In some other embodiments, the baseline programming speed is set as the programming speed of a distant plane, which is far from the VPGM pump. The bias voltages $\Delta$VPASS of the other planes are set at increasing levels with decreasing distance between the planes and the VPGM pump to counteract the increased programming voltages that are received at these closer planes and slow down programming to match the baseline programming speed.

Figure 28:
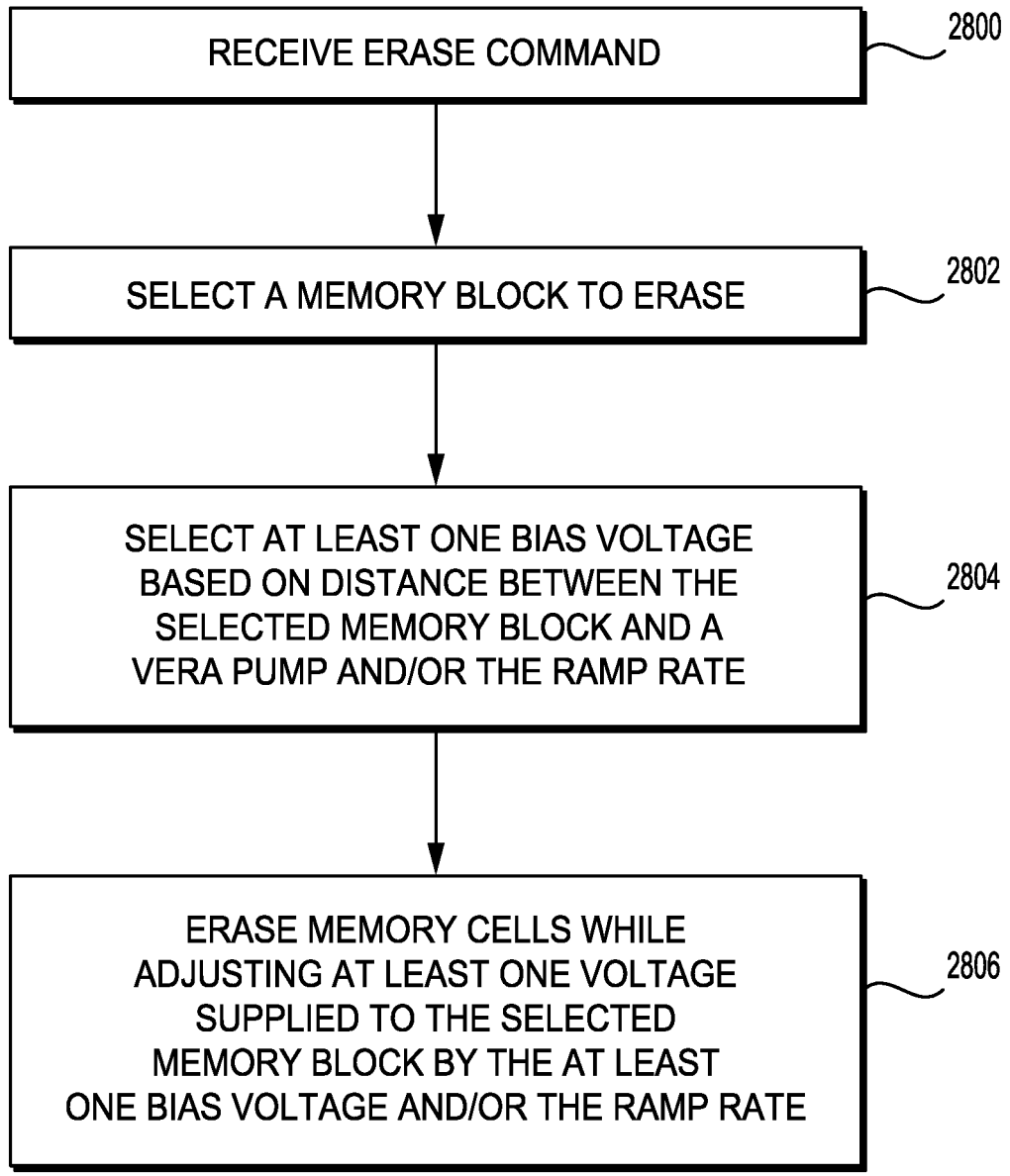
FIG. 28 is a flow chart depicting the steps of erasing a memory block according to an exemplary embodiment.

Turning now to FIG. 28, a flow chart depicting example steps for erasing a memory block or sub-block is provided. At step 2800, an erase command is received by the control circuitry. At step 2802, a memory block (sub-block) to erase is selected. At step 2804, at least one bias voltage and/or ramp rate is selected based on a distance between the selected memory block and the VERA pump in the chip. In some cases, such as if the selected memory block is in a plane that is very close to or very far away from the VERA pump, the at least one bias voltage may be zero Volts (0 V). In other instances, the at least one bias voltage may either be positive or negative. The at least one bias voltage may adjust, for example, a target erase voltage VERA; an erase voltage VERA ramp rate; voltages applied to one or more select gates in the memory block during an erase pulse; and/or voltages applied to the word lines of the selected memory block during the erase pulse. At step 2806, the memory cells are erased while at least one voltage supplied to the selected memory block is adjusted by the at least one bias voltage and/or the ramp rate.

Figure 29:
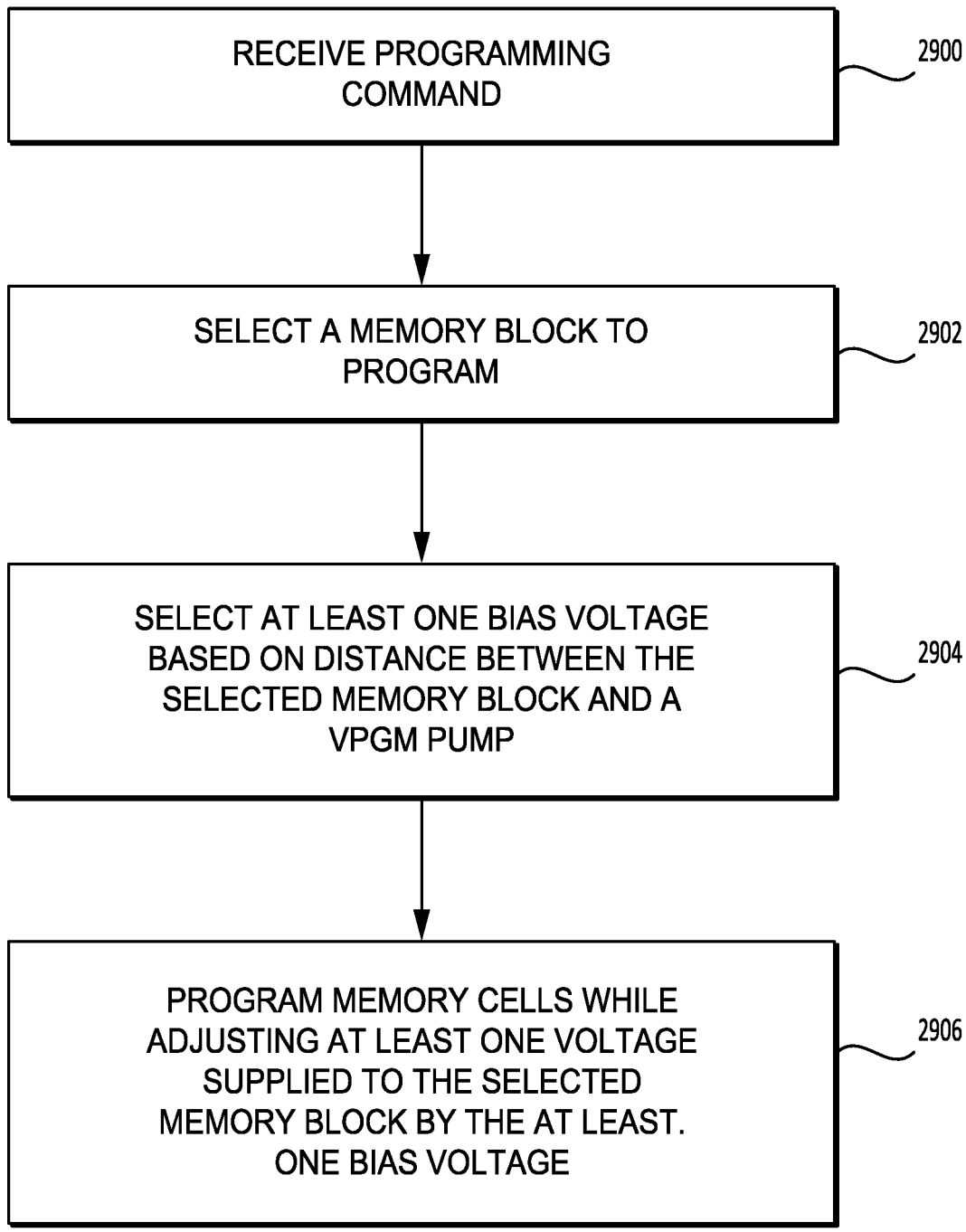
FIG. 29 is a flow chart depicting the steps of programming a memory block according to an exemplary embodiment.

Turning now to FIG. 29, a flow chart depicting example steps for programming a selected word line in a memory block of a plane is provided. At step 2900, a program command is received. At step 2902, a memory block is selected. At step 2904, at least one bias voltage and/or ramp rate is selected based on a distance between the selected memory block and the VPGM pump of the chip. In some cases, such as if the selected plane is very close to or very distant from the VPGM pump, the at least one bias voltage may be zero Volts (0 V). The at least one bias voltage may be, for example, a VPGM bias voltage; a pass VPASS bias voltage applied to one or more unselected word lines during a program pulse; and/or a bit line voltage VBL applied to a plurality of bit lines which are coupled to non-inhibited memory cells in the selected word line. At step 2906, the memory cells of the selected word line are programmed while at least one voltage supplied to the selected memory block is adjusted by the at least one bias voltage and/or the ramp rate.

Various terms are used herein to refer to particular system components. Different companies may refer to a same or similar component by different names and this description does not intend to distinguish between components that differ in name but not in function. To the extent that various functional units described in the following disclosure are referred to as "modules," such a characterization is intended to not unduly restrict the range of potential implementation mechanisms. For example, a "module" could be implemented as a hardware circuit that includes customized very-large-scale integration (VLSI) circuits or gate arrays, or off-the-shelf semiconductors that include logic chips, transistors, or other discrete components. In a further example, a module may also be implemented in a programmable hardware device such as a field programmable gate array (FPGA), programmable array logic, a programmable logic device, or the like. Furthermore, a module may also, at least in part, be implemented by software executed by various types of processors. For example, a module may comprise a segment of executable code constituting one or more physical or logical blocks of computer instructions that translate into an object, process, or function. Also, it is not required that the executable portions of such a module be physically located together, but rather, may comprise disparate instructions that are stored in different locations and which, when executed together, comprise the identified module and achieve the stated purpose of that module. The executable code may comprise just a single instruction or a set of multiple instructions, as well as be distributed over different code segments, or among different programs, or across several memory devices, etc. In a software, or partial software, module implementation, the software portions may be stored on one or more computer-readable and/or executable storage media that include, but are not limited to, an electronic, magnetic, optical, electromagnetic, infrared, or semiconductor-based system, apparatus, or device, or any suitable combination thereof. In general, for purposes of the present disclosure, a computer-readable and/or executable storage medium may be comprised of any tangible and/or non-transitory medium that is capable of containing and/or storing a program for use by or in connection with an instruction execution system, apparatus, processor, or device.

Similarly, for the purposes of the present disclosure, the term "component" may be comprised of any tangible, physical, and non-transitory device. For example, a component may be in the form of a hardware logic circuit that is comprised of customized VLSI circuits, gate arrays, or other integrated circuits, or is comprised of off-the-shelf semiconductors that include logic chips, transistors, or other discrete components, or any other suitable mechanical and/or electronic devices. In addition, a component could also be implemented in programmable hardware devices such as field programmable gate arrays (FPGA), programmable array logic, programmable logic devices, etc. Furthermore, a component may be comprised of one or more silicon-based integrated circuit devices, such as chips, die, die planes, and packages, or other discrete electrical devices, in an electrical communication configuration with one or more other components via electrical conductors of, for example, a printed circuit board (PCB) or the like. Accordingly, a module, as defined above, may in certain embodiments, be embodied by or implemented as a component and, in some instances, the terms module and component may be used interchangeably.

Where the term "circuit" is used herein, it includes one or more electrical and/or electronic components that constitute one or more conductive pathways that allow for electrical current to flow. A circuit may be in the form of a closed-loop configuration or an open-loop configuration. In a closed-loop configuration, the circuit components may provide a return pathway for the electrical current. By contrast, in an open-looped configuration, the circuit components therein may still be regarded as forming a circuit despite not including a return pathway for the electrical current. For example, an integrated circuit is referred to as a circuit irrespective of whether the integrated circuit is coupled to ground (as a return pathway for the electrical current) or not. In certain exemplary embodiments, a circuit may comprise a set of integrated circuits, a sole integrated circuit, or a portion of an integrated circuit. For example, a circuit may include customized VLSI circuits, gate arrays, logic circuits, and/or other forms of integrated circuits, as well as may include off-the-shelf semiconductors such as logic chips, transistors, or other discrete devices. In a further example, a circuit may comprise one or more silicon-based integrated circuit devices, such as chips, die, die planes, and packages, or other discrete electrical devices, in an electrical communication configuration with one or more other components via electrical conductors of, for example, a printed circuit board (PCB). A circuit could also be implemented as a synthesized circuit with respect to a programmable hardware device such as a field programmable gate array (FPGA), programmable array logic, and/or programmable logic devices, etc. In other exemplary embodiments, a circuit may comprise a network of non-integrated electrical and/or electronic components (with or without integrated circuit devices). Accordingly, a module, as defined above, may in certain embodiments, be embodied by or implemented as a circuit.

It will be appreciated that example embodiments that are disclosed herein may be comprised of one or more microprocessors and particular stored computer program instructions that control the one or more microprocessors to implement, in conjunction with certain non-processor circuits and other elements, some, most, or all of the functions disclosed herein. Alternatively, some or all functions could be implemented by a state machine that has no stored program instructions, or in one or more application-specific integrated circuits (ASICs) or field-programmable gate arrays (FPGAs), in which each function or some combinations of certain of the functions are implemented as custom logic. A combination of these approaches may also be used. Further, references below to a "controller" shall be defined as comprising individual circuit components, an application-specific integrated circuit (ASIC), a microcontroller with controlling software, a digital signal processor (DSP), a field programmable gate array (FPGA), and/or a processor with controlling software, or combinations thereof.

Additionally, the terms "couple," "coupled," or "couples," where may be used herein, are intended to mean either a direct or an indirect connection. Thus, if a first device couples, or is coupled to, a second device, that connection may be by way of a direct connection or through an indirect connection via other devices (or components) and connections.

Regarding, the use herein of terms such as "an embodiment," "one embodiment," an "exemplary embodiment," a "particular embodiment," or other similar terminology, these terms are intended to indicate that a specific feature, structure, function, operation, or characteristic described in connection with the embodiment is found in at least one embodiment of the present disclosure. Therefore, the appearances of phrases such as "in one embodiment," "in an embodiment," "in an exemplary embodiment," etc., may, but do not necessarily, all refer to the same embodiment, but rather, mean "one or more but not all embodiments" unless expressly specified otherwise. Further, the terms "comprising," "having," "including," and variations thereof, are used in an open-ended manner and, therefore, should be interpreted to mean "including, but not limited to . . . " unless expressly specified otherwise. Also, an element that is preceded by "comprises . . . a" does not, without more constraints, preclude the existence of additional identical elements in the subject process, method, system, article, or apparatus that includes the element.

The terms "a," "an," and "the" also refer to "one or more" unless expressly specified otherwise. In addition, the phrase "at least one of A and B" as may be used herein and/or in the following claims, whereby A and B are variables indicating a particular object or attribute, indicates a choice of A or B, or both A and B, similar to the phrase "and/or." Where more than two variables are present in such a phrase, this phrase is hereby defined as including only one of the variables, any one of the variables, any combination (or sub-combination) of any of the variables, and all of the variables.

Further, where used herein, the term "about" or "approximately" applies to all numeric values, whether or not explicitly indicated. These terms generally refer to a range of numeric values that one of skill in the art would consider equivalent to the recited values (e.g., having the same function or result). In certain instances, these terms may include numeric values that are rounded to the nearest significant figure.

In addition, any enumerated listing of items that is set forth herein does not imply that any or all of the items listed are mutually exclusive and/or mutually inclusive of one another, unless expressly specified otherwise. Further, the term "set," as used herein, shall be interpreted to mean "one or more," and in the case of "sets," shall be interpreted to mean multiples of (or a plurality of) "one or more," "ones or more," and/or "ones or mores" according to set theory, unless expressly specified otherwise.

The foregoing detailed description has been presented for purposes of illustration and description. It is not intended to be exhaustive or be limited to the precise form disclosed. Many modifications and variations are possible in light of the above description. The described embodiments were chosen to best explain the principles of the technology and its practical application to thereby enable others skilled in the art to best utilize the technology in various embodiments and with various modifications as are suited to the particular use contemplated. The scope of the technology is defined by the claims appended hereto.

What is claimed is:

1. A method of operating a memory device, comprising the steps of:
   preparing a chip that includes an erase voltage pump and a plurality of planes, each of the planes having arrays of memory cells that can be programmed and erased, and at least some of the planes being at different distances from the erase voltage pump, wherein the erase voltage pump is configured to supply an erase voltage;
   adjusting at least one parameter of the erase voltage based on a distance between the selected plane and the erase voltage pump; and
   supplying, from the erase voltage pump, the erase voltage to the selected plane of the plurality of planes during an erase operation.

2. The method as set forth in claim 1, wherein the at least one parameter is a ramp rate.

3. The method as set forth in claim 1, wherein the at least one parameter includes a bias voltage.

4. The method as set forth in claim 3, wherein the erase voltage pump includes a VERA pump and wherein the bias voltage is determined based on the distance between the selected plane and the VERA pump.

5. The method as set forth in claim 4, wherein the erase voltage that is supplied to the selected plane includes an erase voltage VERA that is supplied by the VERA pump to the selected plane and wherein the erase voltage VERA is adjusted by an erase bias voltage that is determined based on a distance between the selected plane and the VERA pump.

6. The method as set forth in claim 4, wherein the erase voltage that is adjusted by the bias voltage is supplied to at least one select gate transistor in a memory block within the selected plane during an erase operation.

7. The method as set forth in claim 4, wherein the erase voltage that is adjusted by the bias voltage is supplied to a plurality of word lines in a memory block within the selected plane during an erase operation.

8. The method as set forth in claim 1, wherein the erase voltage pump includes a VPGM pump and the bias voltage is determined based on a distance between the selected plane and the VPGM pump.

9. The method as set forth in claim 8, wherein the erase voltage that is supplied to the selected plane includes a VPGM voltage that is supplied by the VPGM pump and wherein the VPGM voltage is adjusted by a VPGM bias voltage that is based on the distance between the selected plane and the VPGM pump.

10. A memory device, comprising:
    a chip that includes an erase voltage pump and a plurality of planes, each of the planes having arrays of memory cells that can be programmed and erased, and at least some of the planes being at different distances from the erase voltage pump, wherein the erase voltage pump is configured to supply an erase voltage;

control circuitry configured to program and erase the memory cells, the control circuitry being configured to;
adjust at least one parameter of the erase voltage based on a distance between the selected plane and the erase voltage pump; and
supply, from the erase voltage pump, the erase voltage to a selected plane of the plurality of planes during an erase operation.

11. The memory device as set forth in claim 10, wherein the parameter is a ramp rate.

12. The memory device as set forth in claim 10, wherein the parameter is a bias voltage.

13. The memory device as set forth in claim 12, wherein the erase voltage pump includes a VERA pump and wherein the bias voltage is determined based on the distance between the selected plane and the VERA pump.

14. The memory device as set forth in claim 13, wherein the erase voltage that is supplied to the selected plane includes an erase voltage VERA that is supplied by the VERA pump to the selected plane and wherein the erase voltage VERA is adjusted by an erase bias voltage that is determined based on a distance between the selected plane and the VERA pump.

15. The memory device as set forth in claim 12, wherein the erase voltage pump includes a VPGM pump and the bias voltage is determined based on a distance between the selected plane and the VPGM pump.

16. The memory device as set forth in claim 15, wherein the erase voltage that is supplied to the selected plane includes a VPGM voltage that is supplied by the VPGM pump and wherein the VPGM voltage is adjusted by a VPGM bias voltage that is based on the distance between the selected plane and the VPGM pump.

17. An apparatus, comprising:
a chip that includes a VERA voltage pump and a VPGM voltage pump and a plurality of planes, each of the planes having arrays of memory cells that can be programmed and erased, and at least some of the planes being at different distances from the VERA voltage pump and from the VPGM voltage pump;
a controlling means for programming and erasing the memory cells, the controlling means being configured to;
supply a VPGM voltage to a selected plane of the plurality of planes during a programming operation and being configured to supply a VERA voltage to the selected plane during an erase operation;
adjust the VPGM voltage that is supplied to the selected plane during the programming operation by a VPGM bias voltage that is determined based on a distance between the selected plane and the VPGM voltage pump; and
adjust the VERA voltage that is supplied to the selected plane during the erase operation by a VERA bias voltage that is determined based on a distance between the selected plane and the VERA voltage pump.

18. The apparatus as set forth in claim 17, wherein a magnitude of the VPGM bias voltage increases with increasing distance between the selected plane and the VPGM pump and wherein a magnitude of the VERA bias voltage increases with increasing distance between the selected plane and the VERA pump.

* * * * *